(12) United States Patent
Aoki

(10) Patent No.: US 7,039,293 B1
(45) Date of Patent: May 2, 2006

(54) METHOD AND ELECTRONIC EQUIPMENT FOR TRANSMITTING DATA TO OTHER ELECTRONIC EQUIPMENT ON A NETWORK

(75) Inventor: Yukihiko Aoki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/516,900

(22) Filed: Mar. 1, 2000

(30) Foreign Application Priority Data

Mar. 19, 1999 (JP) ................................. 11-054551

(51) Int. Cl.
*H04N 5/76* (2006.01)

(52) U.S. Cl. ........................................ 386/46; 386/124

(58) Field of Classification Search ................ 386/1, 386/46, 68, 95; 348/569, 570, 731, 732, 348/734, 633, 634, 635; H04N 5/26, 9/79, H04N 5/781, 5/50, 3/24
See application file for complete search history.

(56) References Cited

U.S. PATENT DOCUMENTS

| 5,452,023 A | * | 9/1995 | Kim ............................ 348/731 |
| 5,786,845 A | * | 7/1998 | Tsuria ........................... 725/32 |
| 6,449,352 B1 | * | 9/2002 | Takahashi et al. ...... 379/142.16 |
| 6,529,246 B1 | * | 3/2003 | Maeda ......................... 348/570 |
| 6,556,590 B1 | * | 4/2003 | Saeijs et al. ................. 370/504 |
| 6,697,099 B1 | * | 2/2004 | Smith et al. ................... 348/35 |

\* cited by examiner

*Primary Examiner*—Thai Tran
(74) *Attorney, Agent, or Firm*—Finnegan, Henderson, Farabow, Garrett & Dunner, L.L.P.

(57) ABSTRACT

A data transmission method in which an equipment receiving data is prohibited from displaying a noisy picture or issuing an unusual sound which might possibly destruct a speaker. When the operating mode is switched from the stop state (Stop) to the playback state (PB) to start outputting data recorded on a recording medium, a data recording and/or reproducing medium equipment 20 sets a broadcast connection counter or a point-to-point connection counter from 0 to 1 on transition of the DIF mode (digital input/output mode) from IN to OUT to set a connected state. The data recording and/or reproducing medium equipment 20 inserts a DIT of tf=1 before releasing the muting.

28 Claims, 22 Drawing Sheets

| OFFSET | NAME | OPERATION |
|---|---|---|
| 000h | STATE_CLEAR | STATUS AND CONTROL INFORMATION |
| 004h | STATE_SET | SET STATE_CLEAR BIT |
| 008h | NODE_IDs | INDICATES 16-BIT NODE ID |
| 00Ch | RESET_START | STARTS COMMAND RESET |
| 018h-01Ch | SPLIT_TIMEOUT | PROVIDES MAX SPLIT TIME |
| 200h | CYCLE_TIME | CYCLE TIME |
| 210h | BUSY_TIMEOUT | PROVIDES RETRY LIMITATION |
| 21Ch | BUS_MANAGER | INDICATES BUS MANAGER ID |
| 220h | BANDWIDTH_AVAILABLE | INDICATES BAND ALLOCATABLE TO AISOCHRONOUS COMMUNICATION |
| 224h-228h | CHANNELS_AVAILABLE | INDICATES USING STATE OF EACH CHANNEL |

FIG.4

| 400h | 04h | crc_length | rom_crc_value |
|---|---|---|---|

Bus_info_block

| 404h | "1394" | | | | | | |
|---|---|---|---|---|---|---|---|
| 408h | irmc | cmc | isc | bmc | reserved | cyc_clk_acc | max_rec | reserved |
| 40Ch | Company_ID | | | | | | Chip_ID_hi |
| 410h | Chip_ID_lo | | | | | | |

Root_directory

| 414h | root_length | CRC |
|---|---|---|
| 418h | 03h | module_vendor_id |
| 41Ch | 0Ch | node_capabilities |
| 420h | 8Dh | node_unique_id offset |
| 424h | D1h | unit_directory offset |
| 428h ⋮ | | Optional. |

Unit_directory

| unit_directory_length | CRC |
|---|---|
| 12h | unit_spec_id |
| 13h | unit_sw_version |
| ⋮ | Optional. |

FIG.6

| Address | Register |
|---|---|
| 900h | Output Master Plug Register |
| 904h | Output Plug Control Register #0 |
| 908h | Output Plug Control Register #1 |
| ⋮ | ⋮ |
| 97Ch | Output Plug Control Register #30 |
| 980h | Input Master Plug Register |
| 984h | Input Plug Control Register #0 |
| 988h | Input Plug Control Register #1 |
| ⋮ | ⋮ |
| 9FCh | Input Plug Control Register #30 |

FIG.7

FIG. 8A oMPR

| data rate capability | broadcast channel base | non-persistent extension field | persistent extension field | reserved | number of output plugs |
|---|---|---|---|---|---|
| 2 | 6 | 8 | 8 | 3 | 5 |
(bit)

FIG. 8B oPCR [n]

| on-line | broadcast connection counter | point-to-point connection counter | reserved | channel number | data rate | overhead ID | payload |
|---|---|---|---|---|---|---|---|
| 1 | 6 | 6 | 2 | 6 | 2 | 4 | 10 |
(bit)

FIG. 8C iMPR

| data rate capability | reserved | non-persistent extension field | persistent extension field | reserved | number of input plugs |
|---|---|---|---|---|---|
| 2 | 6 | 8 | 8 | 3 | 5 |
(bit)

FIG. 8D iPCR [n]

| on-line | broadcast connection counter | point-to-point connection counter | reserved | channel number | reserved |
|---|---|---|---|---|---|
| 1 | 6 | 6 | 2 | 6 | 16 |
(bit)

METHOD AND ELECTRONIC EQUIPMENT FOR TRANSMITTING DATA TO OTHER ELECTRONIC EQUIPMENT ON A NETWORK

BACKGROUND OF THE INVENTION

1. Field of the Invention

This invention relates to a data transmission method for transmitting/receiving data on a network comprised of plural interconnected electronic equipment, and to an electronic equipment in such network.

2. Description of Prior Art

In recent years, it is contemplated to interconnect variable equipment having ports for external communication, such as a set top box, oriented to e.g., digital satellite broadcasting, to construct a network, which is to be used.

In such network system, each equipment packetizes e.g., MPEG data, over a network cable, such as serial buses, and transmits the packetized data as a transport stream.

Meanwhile, in the above-described network system, there lacks support in the meaning of advising other equipment of discontinuity points in the stream, such as data transition points.

Thus, if, in such network system, in communication between optional equipment, an unpredictable unusual stream which will cause changes in the time axis is suddenly inputted to a demultiplexer or decoder in the receiving side equipment, hang-up is occasionally produced in the demultiplexer or decoder. Also, in such network system, there is raised such a problem that an equipment which has received the unusual stream displays a noisy picture or destructs a speaker.

SUMMARY OF THE INVENTION

It is therefore an object of the present invention to provide a data transmission method for data transmission/reception in a network system in which there is no risk of an equipment displaying a noisy picture on data reception or outputting an abnormal sound which might destroy a speaker.

It is another object of the present invention to provide an equipment in such network system.

In one aspect, the present invention provides a method for transmitting data in which the data is transmitted/received on a network in which a plurality of electronic equipment are interconnected over a serial bus interface, and which includes a detection step of detecting the timing of inserting discontinuity information data indicating discontinuity of the contents into contents of the data to be recorded and/or reproduced for a recording medium and a step of inserting the discontinuity information data into the data on detection of the timing of inserting the discontinuity information data in the detection step.

In this data transmitting method, the discontinuity information data of the data recorded and/or reproduced for the recording medium is inserted to indicate that the time axis of the data contents is being changed.

In the method for transmitting data in which the data is transmitted/received on a network in which a plurality of electronic equipment are interconnected over a serial bus interface, according to the present invention, discontinuity information data indicating discontinuity of contents of data recorded and/or reproduced for the recording medium is inserted into the data on detection of the timing of insertion of the discontinuity information data. By so doing, the electronic equipment receiving the data outputted to outside is able to comprehend that the time axis of the data contents is changing to render it possible to evade hang-up of each component as well as to evade displaying a noisy picture or outputting an unusual sound which possibly destructs a speaker.

In another aspect, the present invention provides a method for transmitting data in which the data is transmitted/received on a network in which a plurality of electronic equipment are interconnected over a serial bus interface, and which includes a detection step of detecting the timing of inserting discontinuity information data indicating the discontinuity of the contents into contents received from outside through a communication medium different from the serial bus interface, and a step of inserting the discontinuity information data into the data on detection of the timing of inserting the discontinuity information data in the detection step.

In this data transmitting method, the discontinuity information data of the data received from outside over a communication medium different from the serial bus interface is inserted to indicate that the time axis of the data contents is being changed.

In the method for transmitting data in which the data is transmitted/received on a network in which a plurality of electronic equipment are interconnected over a serial bus interface, according to the present invention, discontinuity information data indicating discontinuity of contents of data received from outside over a communication medium different from the serial bus interface is inserted into the data on detection of the timing of insertion of the discontinuity information data. By so doing, the electronic equipment receiving the data outputted to outside is able to comprehend that the time axis of the data contents is changing to render it possible to evade hang-up of each component as well as to evade: displaying a noisy picture or outputting an unusual sound which might destruct the speaker.

In still another aspect, the present invention provides an electronic equipment in which the data is transmitted/received on a network constructed by interconnecting a plurality of electronic equipment over a serial bus interface, and which includes means for generating discontinuity information data indicating discontinuity of the data, means for detecting the timing of inserting the discontinuity information data into contents of the data to be recorded and/or reproduced for a recording medium and means for inserting the discontinuity information data into the data on detection of the timing of inserting the discontinuity information data by the detection means.

In the electronic equipment according to the present invention, the discontinuity information data of the data received from outside over a communication medium different from the serial bus interface is generated and inserted to indicate that the time axis of the data contents is being changed.

In the electronic equipment of the present invention, in which the data is transmitted/received on a network constructed by interconnecting a plurality of electronic equipment over a serial bus interface, there is provided means for generating discontinuity information data of the data recorded on the recording medium, and the discontinuity information data generated by this generating means and which indicates discontinuity in the data contents is inserted into the data on detection of the timing for inserting the discontinuity information data. By so doing, the electronic equipment receiving the data outputted to outside is able to comprehend that the time axis of the data contents is changing to render it possible to evade hang-up of each component as well as to evade displaying a noisy picture or outputting an unusual sound which might destruct the speaker.

In yet another aspect, the present invention provides an electronic equipment in which the data is transmitted/received on a network constructed by interconnecting a plurality of electronic equipment over a serial bus interface, and which includes tuning means for tuning data received from outside over a communication medium different from the serial bus interface and generating means for generating discontinuity information data of data received through the serial bus interface and/or the tuning means. The generating means inserts the generated discontinuity information data into contents of data received through the tuning means.

In this electronic equipment, the discontinuity information data of the data received from outside over a communication medium different from the serial bus interface is generated and inserted to indicate that the time axis of the data contents is being changed.

In the electronic equipment of the present invention, in which the data is transmitted/received on a network constructed by interconnecting a plurality of electronic equipment over a serial bus interface, there are provided tuning means for tuning data received from outside over a communication medium different from the serial bus interface and generating means for generating discontinuity information data of data received through the serial bus interface and/or the tuning means. The discontinuity information data generated by the generating means is introduced into the contents of data received by the tuning means. By so doing, the electronic equipment receiving the data outputted to outside is able to comprehend that the time axis of the data contents is changing to render it possible to evade hang-up of each component as well as to evade displaying a noisy picture or outputting an unusual sound which might destruct the speaker.

BRIEF DESCRIPTION OF THE DRAWINGS

FIG. 4 illustrates the position, name and operation of main CSR.

FIG. 6 illustrates details of a bus information block, a root directory and a unit directory.

FIG. 7 illustrates the structure of PCR.

FIG. 8 illustrates the structure of oMPR, oPCR, iMPR and iPCR.

DESCRIPTION OF THE PREFERRED EMBODIMENTS

Figure 1:
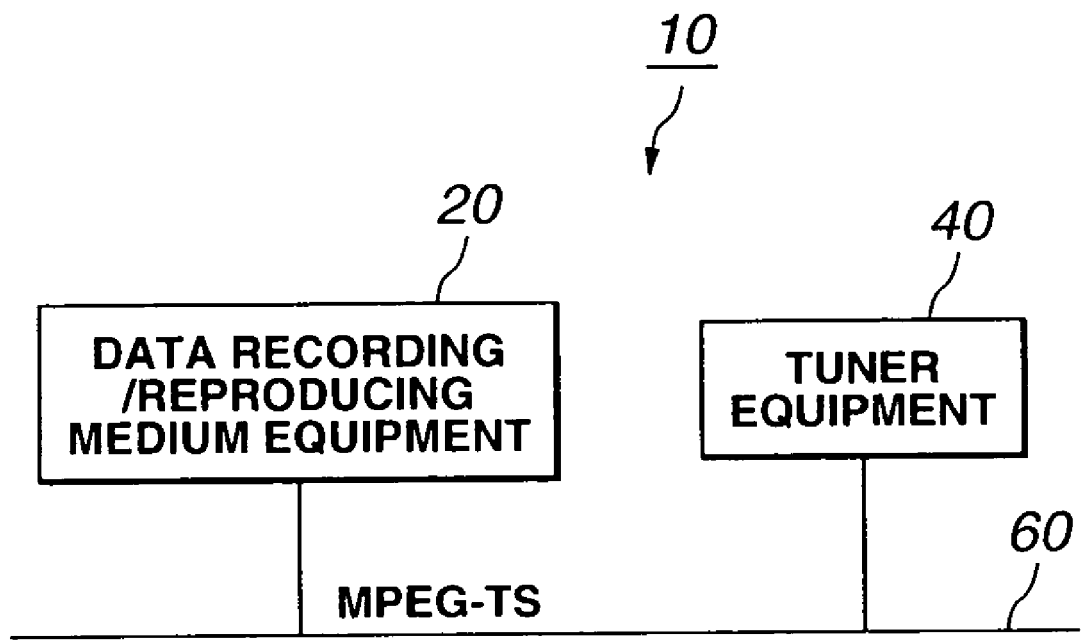
FIG. 1 is a block diagram for illustrating the structure of an IEEE 1394 network embodying the present invention.

Referring to the drawings, preferred embodiments of according to the present invention will be explained in detail.

The present invention is embodied in a network 10 comprised of plural electronic equipment over an IEEE 1394 serial bus 60 conforming to the IEEE Std. 1394-1995 IEEE standard for a high performance serial bus recognized by the IEEE (The Institute of Electrical and Electronics Engineers, Inc.). This network is referred to herein as IEEE 1394 network. Here, it is assumed that two electronic equipment on the % IEEE 0.1394 network, namely a data recording and/or reproducing medium equipment 20 and a tuner equipment 40, are being handled and data transmission/reception takes place between these two equipment.

In the following explanation, the data recording and/or reproducing medium equipment 20 is an electronic equipment of the so-called digital home video system (D-VHS) such as a video tape recorder (VTR), audio visual hard disc drive (AV-HDD) or a digital video disc (DVD). The data recording and/or reproducing medium equipment 20 records MPEG data, compressed in accordance with the so-called MPEG (Moving Picture Experts Group) system, on a tape or a disc as a recording medium, not shown.

The tuner equipment 40, on the other hand, is an electronic equipment having a tuner function, such as an integrated receiver decoder for digital satellite broadcast, or a digital television (DTV), and transmits/receives MPEG data.

In the IEEE 1394 network 10, MPEG data, reproduced and packetized by the data recording and/or reproducing medium equipment 20, is transmitted as a transport stream, abbreviated herein to MPEG-TS, to the tuner equipment 40, which then unpacketizes and expands the received MPEG-TS. Also, in the IEEE 1394 network 10, the MPEG-TS, received and unpacketized by the tuner equipment 40, are transmitted to the data recording and/or reproducing medium equipment 20, which then unpacketizes the received MPEG-TS to record the unpacketized data on the recording medium.

The IEEE 1394 interface, to which each equipment is connected, is hereinafter explained. FIG. 2 shows the structure of a transmission cycle of data transmitted by the IEEE 1394 network 10. In IEEE 1394, data is split into packets and time-divisionally transmitted with the length of a cycle 125 µs long as a reference. This cycle is created by a cycle start signal furnished from a node having a cycle master function (one of the equipment shown in FIG. 1). An aisochronous packet secures a band necessary for transmission (having time as unit but termed a band) as from the leading ends of all of the cycles. Thus, in aisochronous transmission, data transmission in a pre-set time is assured. However, if transmission error has occurred, there is no protective scheme, and hence data is lost.

The node which has acquired a bus as a result of the arbitration sends out an asynchronous packet during the time not used for aisochronous transmission of each cycle. In asynchronous transmission, reliable transmission is assured by employing acknowledge and retry. However, transmission timing is not constant.

In order for a predetermined node (electronic equipment) to carry out aisochronous transmission, the node must be consistent with the aisochronous function. Also, at least one of the nodes associated with the aisocbronous function must have a cycle master function. Moreover, at least one of the nodes connected o the IEEE 1394 network 10 must have an aisochronous resource manager function.

Figure 3:
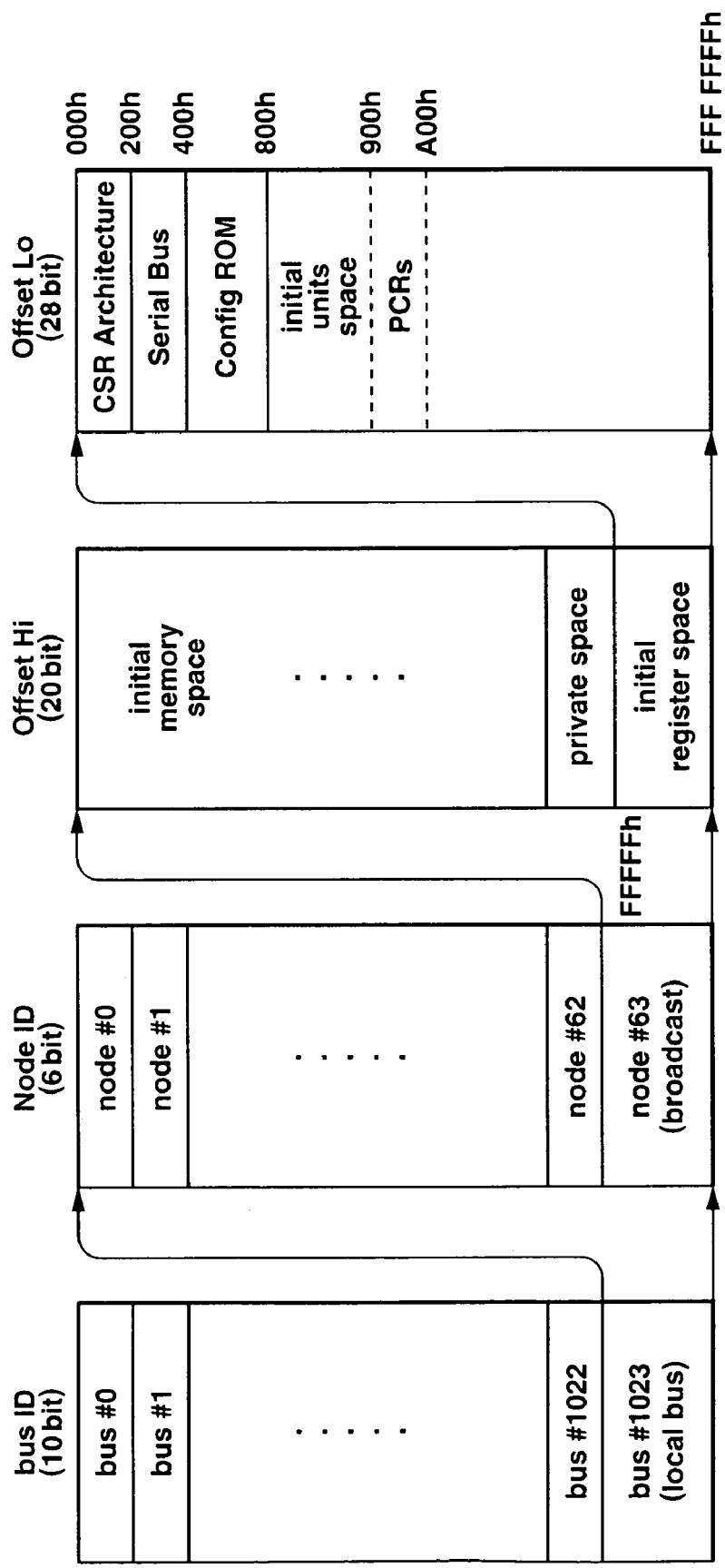
FIG. 3 illustrates the structure of an address space of a CSR architecture.

The IEEE 1394 interface is consistent with the CSR (control and status register) architecture having a 64-bit address space prescribed in ISO/IEC 13213. FIG. 3 illustrates the structure of the address space of the CSR architecture, in which upper 16 bits are node IDs indicating the node on the IEEE 1394 interface, with the remaining 48 bits being used for specifying the address space accorded to each node. These upper 16 bits are further divided into 10 bus ID bits and physical 6 ID bits (node ID in the narrow sense of the term). Since all 1 bits are used for a specified objective, it is impossible to designate 1023 buses and 63 nodes.

In the 256 terabyte address space, defined by lower 48 bits, the space defined by the upper 20 bits is split into an initial register space used for a 2048 byte CSR specific register or IEEE 1394 specific register, a private space and an initial memory space. If the space defined by the upper 20 bits is the initial register space, the space defined by the lower 28 bits is used as a configuration ROM (read-only memory), an initial unit space used for a node-specific purpose, or as a plug control register (PCR).

FIG. 4 shows an offset address, name and the function of the main CSR. The offset in FIG. 4 denotes an offset address from the address FFFFF000000h where the initial register space begins (the number with h at the trailing end denotes a hexadecimal number). The bandwidth available register having an offset 220h indicates a band allocatable to aisochronous communication. Only the value of the node operating as an aisochronous resource manager is retained to be valid. That is, although the CSR of FIG. 3 is owned by each node, only the bandwidth available register of the aisochronous resource manager is retained to be valid. Stated differently the bandwidth available register is owned substantially by solely the aisochronous resource manager.

In the bandwidth available register, a maximum value is stored in case no band is allocated to the aisochronous communication, with the value stored in the bandwidth available register being decremented each time a band is allocated.

The respective bits of the channel available register with the offset of 224h to 228h are associated with the channel numbers of from 0 to 63. If the bit is 0, it indicates that the channel has already been allocated. Only the channel available register of the node operating as the aisochronous resource manager is valid.

Figure 5:
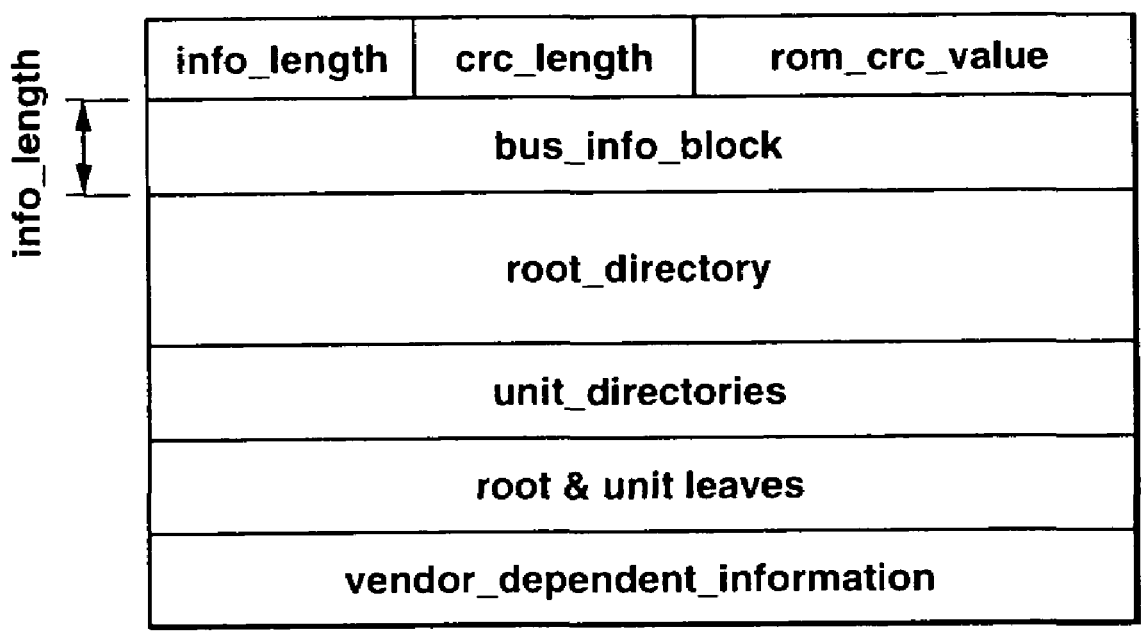
FIG. 5 illustrates the general ROM format.

Returning to FIG. 3, the configuration ROM, which is based on the general ROM format, is arranged in the addresses 200h to 400h in the initial register space. FIG. 5 illustrates the general ROM format. The node as the accessing unit on the IEEE 1394 is able to have plural units operating independently of one another as the address space is used in the node in common. The unit directories can designate the version or the position of the software for the unit. Although the positions of the bus_info_block and the root_directory are fixed, the positions of the other blocks are designated by the offset address. In the company ID in the bus_info_block are stored ID numbers denoting the maker of the equipment. In the chip_ID is stored a sole ID (sole ID in the world) proper to the equipment and not overlapping with other equipment. According to the IEC61883 (International Electrotechnical Commission) standard, 00h, A0h and 2Dh are written in the first, second and third octets, respectively, of the unit spec ID of the unit directory of the equipment which has satisfied the IEC61883. 01h and 1 are written in the first octet and in the least significant bit (LSB) of the third octet of the unit switch version (unit_sw_version), respectively.

For controlling the equipment input/output through an interface, the node has a plug control register (PCR) prescribed by IEC61883 in the addresses 900h to 9FFh in the initial unit space of FIG. 3. This has materialized the concept "plug" in order to logically form a signal path similar to the analog interface. The structure of PCR is shown in FIG. 7 in which PCR denotes an output plug. There are provided oPCR (output plug control register) denoting an output plug and iPCR (input plug control register) denoting an input plug. Also, the PCR has an oMPR (output master Plug Register) and an iMPR (input master Plug Register) specifying the information of the input and output plugs proper to each equipment. Although plural pMPRs and iMPRs are not owned by each equipment, it is possible for each equipment to own plural oPCRs and iPCRs, associated with the respective plugs. The PCRs shown in FIG. 7 each have 31 oPCRs and iPCRs. The flow of the aisochronous data is controlled by operating the registers associated with the respective plugs.

FIGS. 8A to 8D show the structure of oMPR, oPCR, iMPR and iPCR, respectively. In 2-bit data rate capability (data_rate_capability) on the MSB sides of the oPCR and iMPR, there is stored the code denoting the maximum transmission speed of the aisochronous data that can be transmitted or received by the equipment. The broadcast_channel_base of oMPR defines the number of the channel used for the broadcast output.

In the 5-bit number_of_output_plugs on the LSB side of oMPR; is stored the value denoting the number of the output plugs owned by the equipment, that is the number of oPCRs. In the 5-bit number_of_input_plugs on the LSB side of the iMPR is stored the value of the number of input plugs of the equipment, that is the value denoting the number of the iPCRs. The non-persistent_extension_field and the persistent_extension_field ard are as defined for future extension.

The on_line of the MSB of the oPCR and the iPCR denote the plug using state. If the value is 1 or 0, it indicates that the plug is online and offline, respectively. The value of the broadcast_connection counter of oPCR and iPCR denote the presence and non-presence (1 and 0) of the broadcast connection, respectively. The value of the point-to-point connection counter (point-to-point_connection_counter) of the oPCR and the iPCR, with a length of 6 bits, denote the number of point-to-point connections owned by the plug.

The value of the channel_number of the oPCR and the iPCR, with a length of 6 bits, denotes the number of the aisochronous channel to which the plug is connected. The value of the data_rate of the oPCR with a 2-bit width length denotes the actual transmission rate of the aisochronous data outputted by the plug. The code stored in the overhead_ID of the oPCR, with a 10-bit length, denotes the maximum number of data contained in the aisochronous packet that can be handled by the plug.

Figure 9:
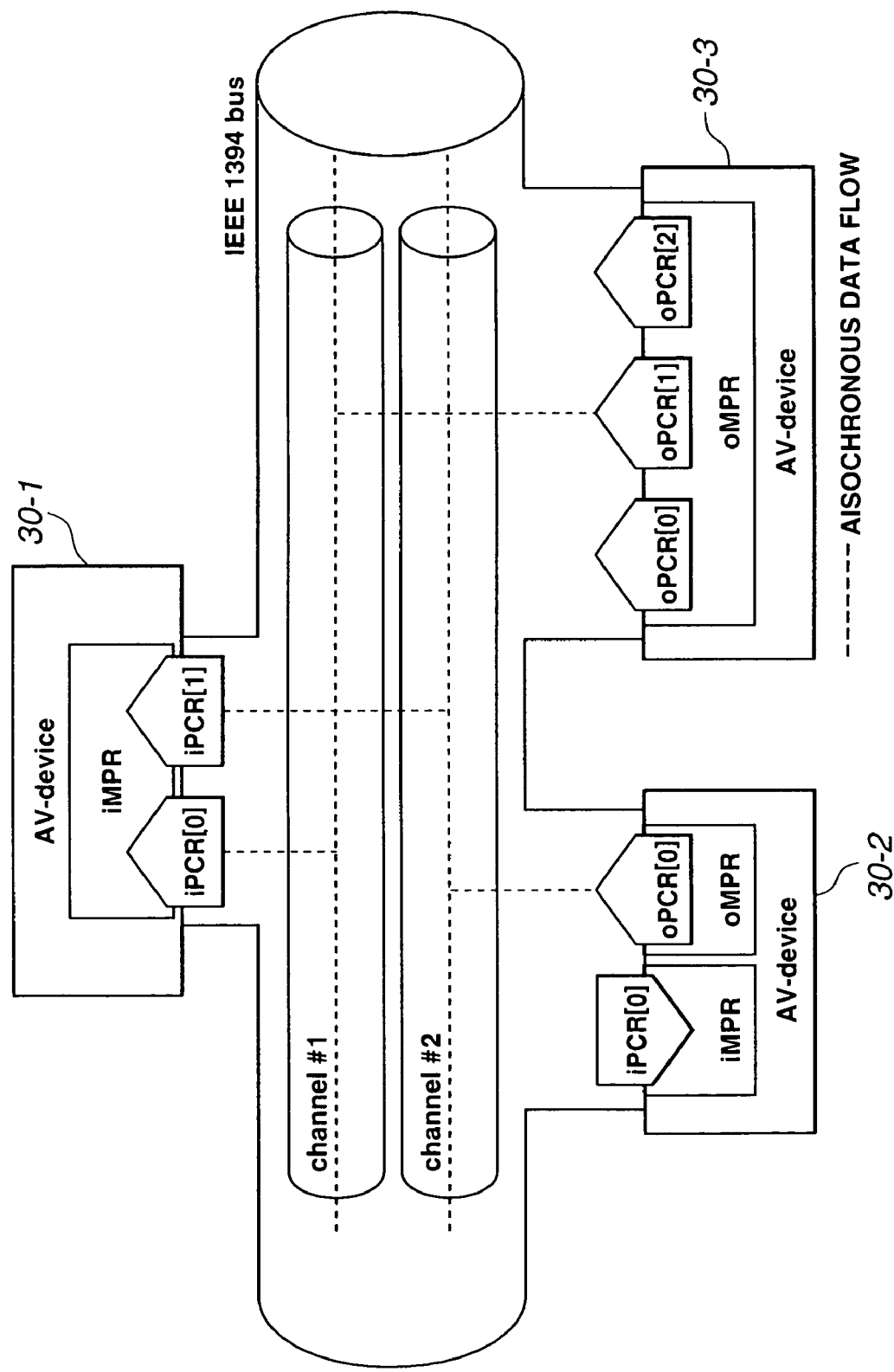
FIG. 9 illustrates the relationship between the plug, plug control register and an aisochronous channel.

FIG. 9 shows the relationship among the plug, plug control register and the aisochronous channel. The AV devices 30-1 to 30-3 are interconnected over an IEEE 1394 serial bus. The aisochronous data, the channel for which has been specified by the oPCR[1], among the oPCR[0] to oPCR[2], whose transmitting rate and number of oPCRs have been prescribed by the oMPR of the AV device 30-3, is sent out to the channel #1: (channel #1) of the IEEE 1394 serial bus. The AV device 30-1 reads in the aisochronous data sent out to the input channel #1 of the IEEE 1394 serial bus by the iPCR [1], the input channel #1 for which has been specified, from the iPCR[0] and iPCR[1], the transmission rate and the number of iPCRs have been prescribed by the iMPR of the AV device 30-1. Similarly, the AV device. 30-2 sends out the aisochronous data to the channel #2 specified by the OPCR[0], whilst the AV device 30-1 reads in the aisochronous data from the channel #2 specified by the iPCR[1].

Figure 2:
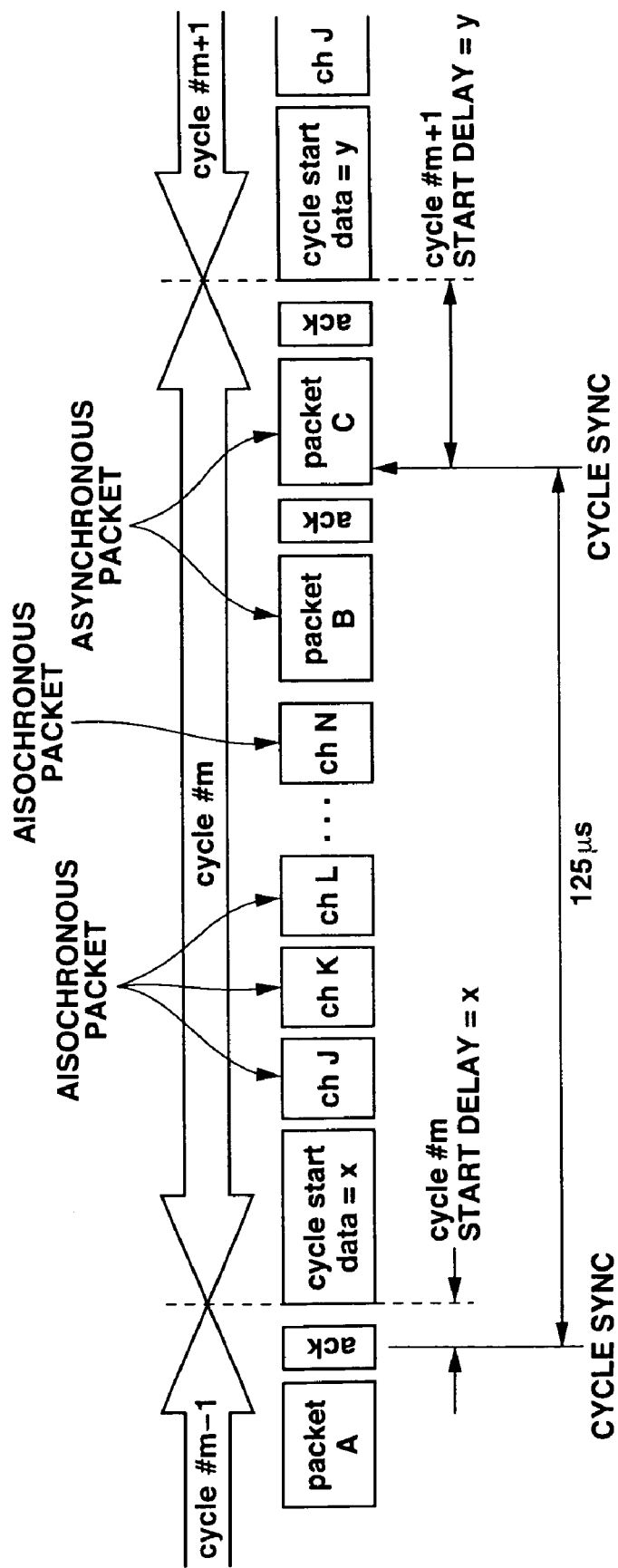
FIG. 2 shows a cyclic structure of data transmission of the equipment interconnected over IEEE 1394.
Figure 10:
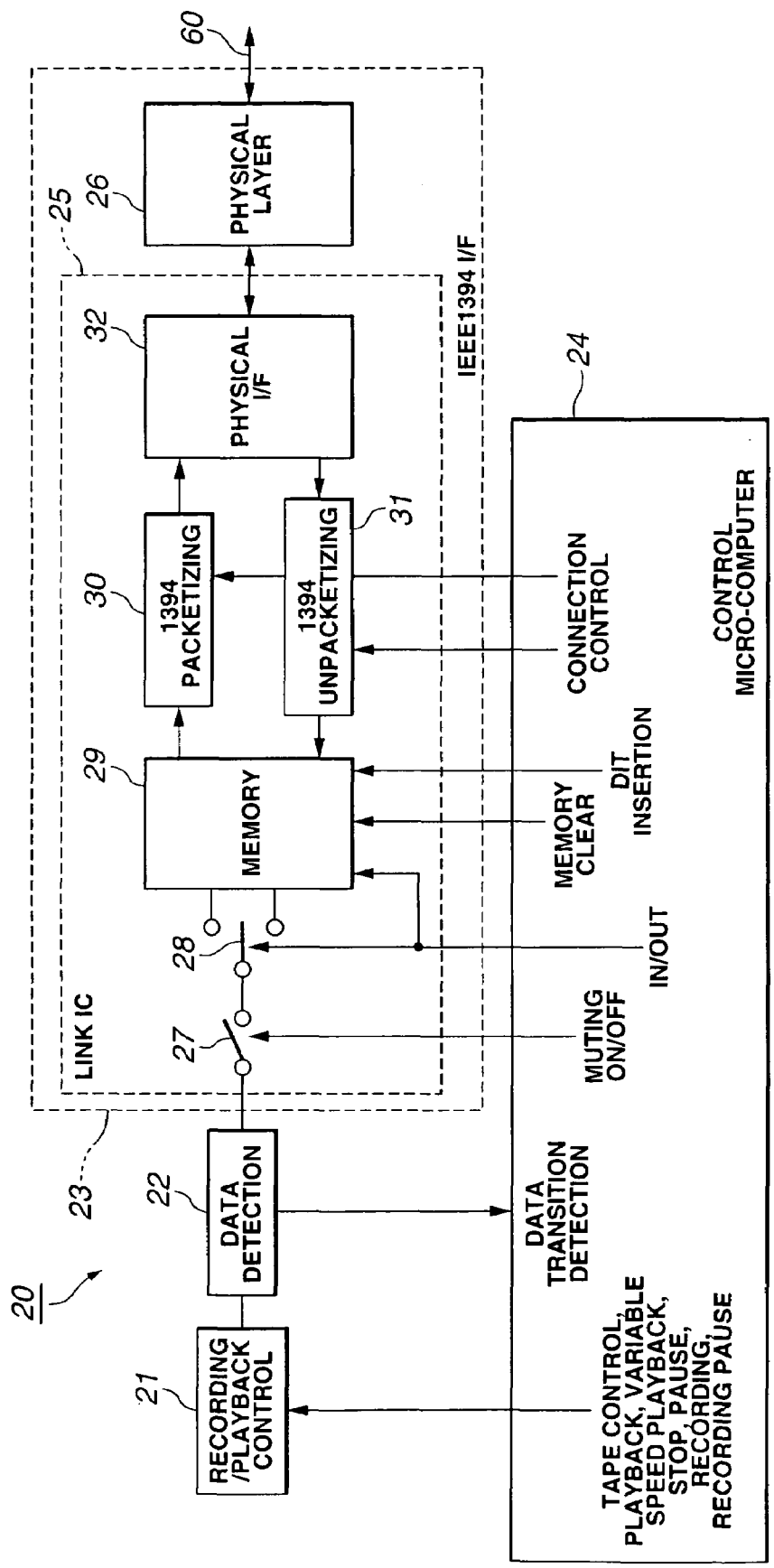
FIG. 10 is a block diagram showing the structure of a data recording and/or reproducing medium equipment on the IEEE 1394 network.
Figure 11:
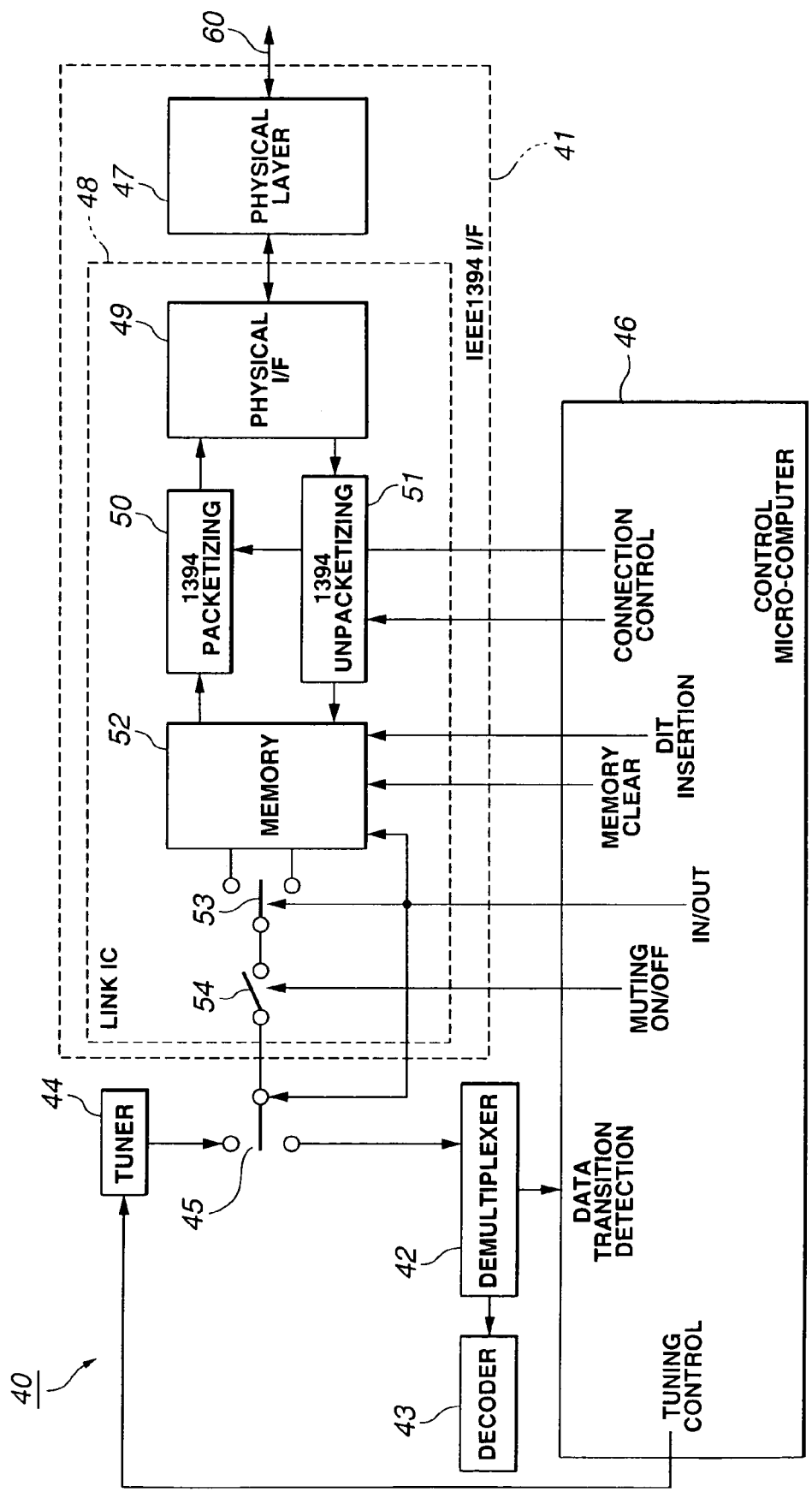
FIG. 11 is a block diagram showing the structure of a tuner equipment on the IEEE 1394 network.

Referring to FIGS. 10 and 11, a data recording and/or reproducing medium equipment 20 and the tuner equipment 40, shown in FIG. 1, are now explained.

Referring to FIG. 2, the data recording and/or reproducing medium equipment 20 includes a recording and/or reproduction controller 21 for controlling the data recording and/or reproducing operation for the recording medium, a data detector 22 as detection means for detecting the point of transition of data recorded on the recording medium, an IEEE 1394 interface, abbreviated below to IEEE 1394 I/F 23, and a control micro-computer 24 for controlling the respective components, adapted for generating discontinuity information data, which will be explained subsequently.

The recording and/or reproducing controller 21 controls the operation of data recording and/or reproduction for a recording medium, such as a tape or a disc. That is, the recording and/or reproducing controller 21 receives control signals controlling the operation of the tape as a recording medium, the playback operation, such as normal speed reproduction or variable speed reproduction of data recorded on the recording medium, or the stop operation, such as stop or pause of data reproduction, from the control micro-computer 24, in order to control the operation of the recording medium.

The data detector 22 detects transition points of data recorded on the recording medium, such as the boundary of different data or the boundary of analog and digital data, to transmit the results of detection to the control micro-computer 24.

The IEEE 1394 I/F 23 includes a link IC 25, responsible for packetization of data and unpackatization of packeted data, and a physical layer 26 for data exchange between the link IC 25 and an IEEE 1394 serial bus 60 as a bit string of electrical signals.

The link IC 25 includes a changeover switch 27, the state of which is changed over depending on whether or not data reproduced from the recording medium is to be muted, a changeover switch 28, the state of which is changed over depending on whether or not data is to be recorded or reproduced, and a memory 29 for transiently storing data for recording and/or reproduction to serve as a buffer for inserting discontinuity information table (DIT) for data recorded from the control micro- computer 24, as later explained. The link IC 25 also includes a packetization unit 30 for packetizing data reproduced from the recording medium to MPEG-TS, an unpacketization unit 31 for unpacketizing the MPEG-TS received from outside, and a physical I/F 32 as an interface with the physical layer 26.

The IEEE 1394 I/F 23 receives the MPEG-TS transmitted from outside over the IEEE 1394 serial bus 60, while processing the data recorded on the recording medium to form MPEG-TS to route it to the IEEE 1394 serial bus 60 for transmission to outside.

The control micro-computer 24 controls the recording and/or reproducing controller 21, data detector 22 and the IEEE 1394 I/F 23. That is, the control micro- computer 24 sends the control signal for controlling the operation of the recording medium to the recording and/or reproducing controller 21. The control micro- computer 24 also receives the results of detection of the data transition from the data detector 22. The control micro-computer 24 also controls the changeover switches 27, 28 responsive to the operating modes, while setting the data transmission, reception or concurrent transmission/reception states to route a control signal for data input/output control for the memory 29. The control micro-computer 24 also sends a control signal to the memory 29 for erasure of data held in the memory 29 or the DIT to be inserted into the data. The control micro-computer 24 also routes a control signal for controlling the connection responsible for logical connection or disconnection among the equipment to the 1394 packetization unit 30 and the 1394 unpacketization unit 31.

The data recording and/or reproducing medium equipment 20 receives the MPEG-TS from outside over the IEEE. 1394 serial bus 60 to perform the above-described variable processing operations to record the processed data on the recording medium, while reproducing the data recorded on the recording medium to perform variable processing operations thereon to route the resulting MPEG-TS over the IEEE 1394 serial bus 60 to outside.

Referring to FIG. 11, the tuner equipment 40 includes an IEEE 1394 I/F 41 for data interfacing with outside, and a multiplexer 42 adapted for separating the multiplexed data received from outside into plural signals, and having the function as detection means for detecting the transition of the time axis of the data. The tuner equipment 40 also includes a decoder 43 for decoding the received data and a tuner unit 44 as tuning means for data tuning for data received through other recording mediums, such as digital broadcasting satellite. The tuner equipment 40 also includes a changeover switch 45 for making selection between a demultiplexer 42 and the tuner unit 44 depending on the operating mode and a control micro-computer 46 adapted for controlling variable components and having the function as means for generating the DIT as the above-mentioned discontinuity information data (DIT).

The IEEE 0.1394 I/F 41 also includes a physical layer 47 for data exchange between a link IC 48 and an IEEE 1394 serial bus 60 as bit strings of electrical signals and the link IC 48 for performing the processing of data packetizing and unpacketizing the packeted data.

The link IC 48 includes a physical I/F 49, as an interface with the physical layer 47, an IEEE 1394 packetization unit 50 for packetizing the data recorded by the tuner unit 44 to the MPEG-TS, and a 1394 unpacketization unit 51 for unpacketizing the MPEG-TS received from outside over the IEEE 1394 serial bus 60. The IEEE 1394 I/F 41 also includes a memory 52 for storing the received data and for operating as a buffer for inserting the DIT received from the control micro-computer 46 into data, a changeover switch 53, the state of which is changed over depending on whether the data received over the IEEE 1394 serial bus 60 is to be decoded or the data received by the tuner unit 44 is to be outputted to a monitor or a speaker, not shown, a VTR handling analog data, not shown, or to outside, and a changeover switch 54, the state of which is changed over depending on whether the data received over the IEEE 1394 serial bus 60 or the data received by the tuner unit 44 is to be muted.

The IEEE 1394 I/F 41 receives the MPEG-TS transmitted from outside over the IEEE 1394 serial bus 60, while processing the data received by the tuner unit 44 to route it over the IEEE 1394 serial bus 60 for transmission to outside.

The demultiplexer 42 separates the multiplexed data received from outside into plural signals. The demultiplexer 42 detects data transition, such as the boundary of different data obtained on separation and the boundary of analog and digital data, to transmit the detected result to the control micro-computer 46.

The decoder 43 decodes the data separated by the demultiplexer 42.

The tuner unit 44 receives data through other recording mediums, such as broadcasting satellite, while performing tuning control under control by the control micro-computer 46.

The changeover switch 45 switches between the demultiplexer 42 and the tuner unit 44, under control by the control micro-computer 46, to change over the data route. That is the changeover switch 45 connects to the demultiplexer 42 if the data received over the IEEE 1394 serial bus 60 is to be decoded. The changeover switch 45 connects to the tuner unit 44 if the data received by the tuner unit 44 is to be outputted to a monitor, a speaker, a VTR or to outside.

The control micro-computer 46 controls the IEEE 1394 I/F 41, demultiplexer 42, decoder 43 and the tuner unit 44. That is, the control micro-computer 46 transmits control signal for connection control supervising logical connection and disconnection among the equipments to the 1394 packetizing unit 50 and to the 1394 unpacketizing unit 51 in accordance with the connection management consistent with the IEC 1883. Also, the control micro-computer 46 transmits control signals for erasing data held by the memory 52 and DIT for insertion into data to the memory 52. The control micro-computer 46 also transmits control signals for changing the operating mode depending on whether the data received over the IEEE 1394 serial bus 60 or data received by the tuner unit 44 is to be outputted to the monitor, speaker, VTR or to outside, while transmitting control signals to the changeover switch 54 for controlling whether or not these data is to be muted. In addition, the control micro-computer 46 receives the result of data transition detection from the demultiplexer 42, while transmitting tuning control signal to the tuner unit 44.

The tuner equipment 40 receives the MPEG-TS from outside over the IEEE 1394 serial bus 60 to perform variable processing operations thereon, while performing variable-processing operations on data received by the tuner unit 44 to output the resulting MPEG-TS to the monitor, speaker, VTR or to outside.

In the IEEE 1394 network 10, the control micro-computers 24, 46 of the data recording and/or reproducing medium equipment 20 and the tuner equipment 40 send the DIT to the respective memories 29, 52 to insert the DIT into the data in case the time axis or the services of the contents have been changed. This DIT is a sort of the service information prescribed in the digital video broadcasting (DBS) system which is the European digital broadcasting system. This DIT has a one-bit flag transition_flag, abbreviated to tf, as the syntax.

This tf indicates the sort of the status transition in the MPEG-TS. If tf is 1, it indicates that status transition has occurred due to changes in the source data in the MPEG-TS. These changes in the source data can be changes in the MPEG-TS itself, while it can be changes in the position in the MPEG-TS as in the case of time shift. That is, tf equal to 1 indicates that the source data is discontinuous. If tf is 0, it indicates that the status transition has been produced due to changes in only the selection, that is that the data stays at the same position in the same TS and is continuous.

The method for DIT insertion into data is hereinafter explained according to different cases in which the DIT should be introduced.

First, the DIT should be inserted into data for transmission when the DIT recorded on the recording medium is being reproduced, specifically, when the DIT accompanying the discontinuous MPEG-TS recorded on the recording medium of the data recording and/or reproducing medium equipment 20 is being reproduced.

In such case, the tuner equipment 40 inserts the DIT, when changing over the channel, to the data received from the data recording and/or reproducing medium equipment 20 over the IEEE 1394 serial bus 60 and unpacketized.

The DIT should be inserted into data and transmitted when starting data outputting, specifically, when the data recording and/or reproducing medium equipment 20 causes operating mode transition from the stop state to the playback (PB) state to start outputting of data recorded on the recording medium.

Figure 12:
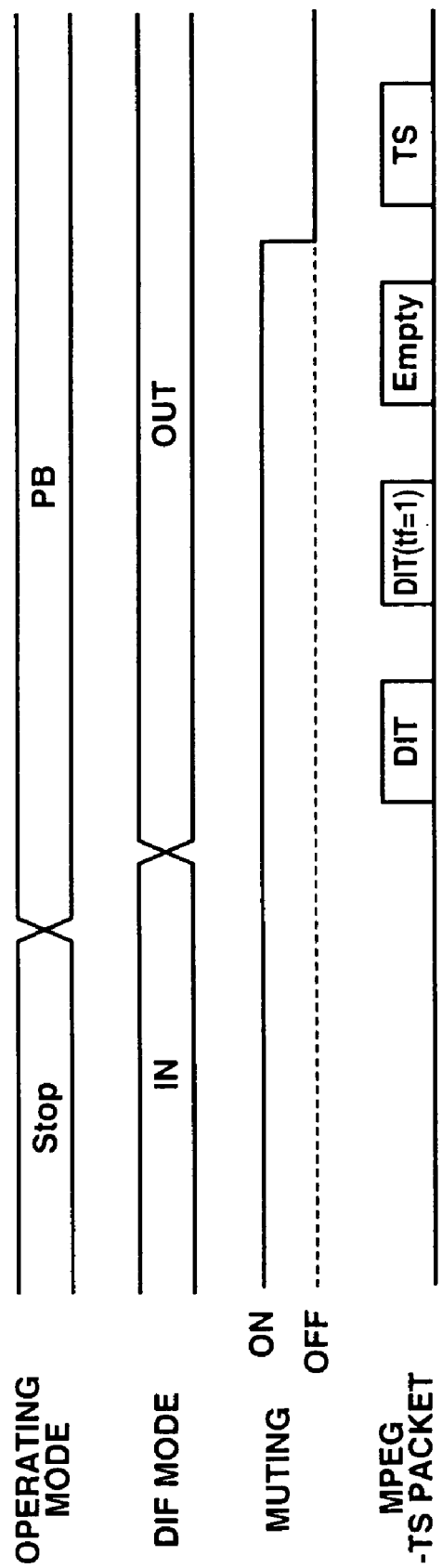
FIG. 12 is a timing chart for DIT insertion in case of transition of the data recording and/or reproducing medium equipment from a stop state to a playback state.

In such cases, the operating mode in the data recording and/or reproducing medium equipment 20, the data input/output mode, abbreviated below to DIF mode, in the connection management portion of the data recording and/or reproducing medium equipment 20, control signals for muting control sent from the control micro-computer 24 of the data recording and/or reproducing medium equipment 20 to the switch 27, and time changes in the MPEG-TS packet, are shown in the timing chart shown in FIG. 12. That is, if the DIF mode is changed from the input (IN) to the output (OUT), the data recording and/or reproducing medium equipment 20 sets a broadcast connection counter, abbreviated below to Bcc, or the point-to-point connection counter, abbreviated below to Pcc, in the oPCR of the own output plug, as the logical data entrance/exit, from 0 to 1 to set the connection state. The data recording and/or reproducing medium equipment 20 inserts one DIT tf=1 before releasing the muting. In the drawing, Empty means an empty packet.

The above cases in which the DIT should be introduced include such a case when the data starts to be outputted in the connected state, specifically, such a case in which the data recording and/or reproducing medium equipment 20 changes the operating mode from the stop state to the playback state during dubbing to start outputting the data recorded on the recording medium.

In such case, the data recording and/or reproducing medium equipment 20 inserts a DIT tf=1 before releasing the muting.

Figure 13:
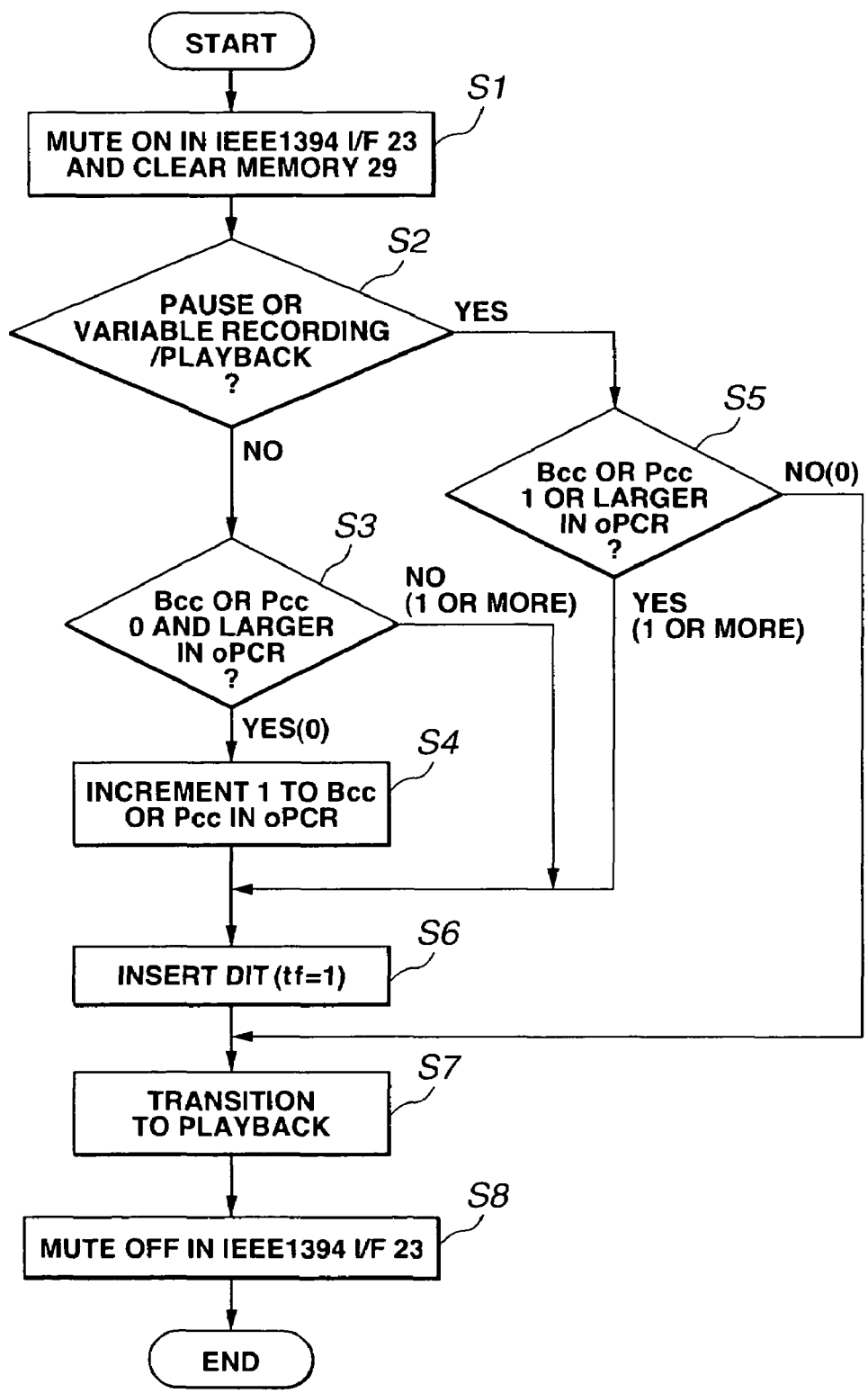
FIG. 13 is a flowchart for illustrating a sequence of steps in DIT insertion in case of transition of the data recording and/or reproducing medium-equipment from a stop state to a playback state.

The sequence of operations in the data recording and/or reproducing medium equipment 20 is as shown in FIG. 13. That is, the data recording and/or reproducing medium equipment 20 at step S1 sends a control signal from the control micro- computer 24 to the switch 27, in order to set the muting on state to prevent data from being inputted to the IEEE 1394 I/F 23. The data recording and/or reproducing medium equipment 20 also sends a control signal to the memory in the IEEE 1394 I/F 23 to clear data held in the memory 29.

The data recording and/or reproducing medium equipment 20 then deciphers at step S2 whether the operating mode is pause, playback pause (PB pause), fast feed (cue), fast rewind (review) or variable speed playback state, such as slow reproduction (slow).

If the operating state is the pause or variable speed playback, the data recording and/or reproducing medium equipment 20 checks at step S5 whether the Bcc or Pcc at oPCR is not less than 1, that is whether or not the connected state persists.

If Bcc and Pcc in oPCR are both 0, the data recording and/or reproducing medium equipment 20 proceeds to step S7.

If Bcc or Pcc in oPCR is not less than 1, the data recording and/or reproducing medium equipment 20 proceeds to the processing at step S6.

If the data recording and/or reproducing medium equipment 20 at step S2 has verified that the pause or variable speed playback does not persist it checks at step S3 whether or not Bcc and Pcc in oPCR are both 0.

If Bcc or Pcc in oPCR is not less than 1, the data recording and/or reproducing medium equipment 20 proceeds to the processing at step S6.

If Bcc and Pcc in oPCR are both 0, the data recording and/or reproducing medium equipment 20 at step S4 increments Bcc or Pcc in oPCR by 1.

Th data recording and/or reproducing medium equipment 20 at step S6 sends the DIT tf=1 from the control micro-computer 24 to the memory 29 to insert this DIT to the data.

After transfer to the playback state at step S7, the data recording and/or reproducing medium equipment 20 sends at step S8 a control signal from the control micro-computer 24 to the switch 27 to turn off the muting to permit data to be inputted to the IEEE 1394 I/F 23. The data recording and/or reproducing medium equipment 20 then terminates the sequence of operations.

Meanwhile, if, in the data recording and/or reproducing medium equipment 20, the DIF mode is for outputting and the own oPCR is set by remote control to Bcc=0 or to Pcc=0.0, then. DIT is not inserted.

By this sequence of operations, the data recording and/or reproducing medium equipment 20 inserts the DIT into the data recording and/or reproducing medium equipment 20 at the aforementioned timing. The data recording and/or reproducing medium equipment 20 unpacketizes the data, having the DIT introduced therein, in the 1394 packetizing unit 30, and outputs the packeted data as MPEG-TS to outside over the IEEE 1394 serial bus 60.

Figure 14:
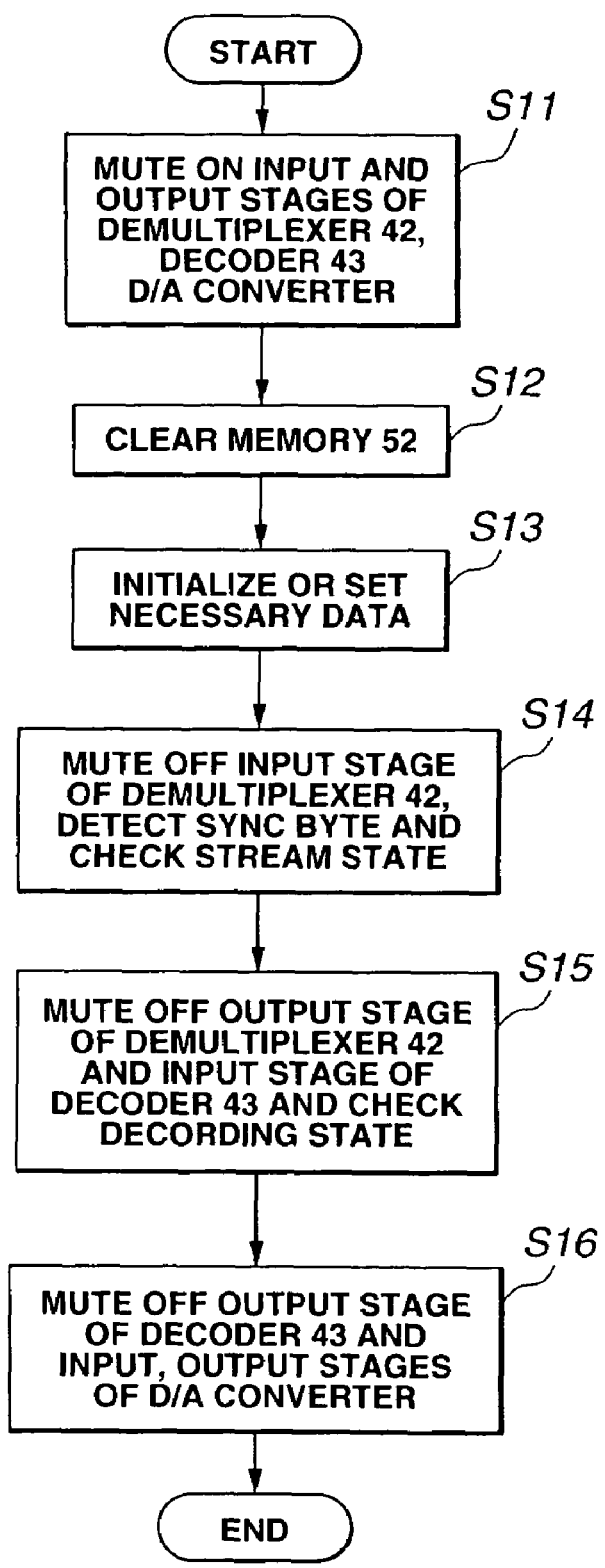
FIG. 14 is a flowchart for illustrating a sequence of steps in a tuner equipment in receiving a stream having DIT inserted therein.

On the other hand, the tuner equipment 40 receives the MPEG-TS sent from the data recording and/or reproducing medium equipment 20 to perform a sequence of operations shown in FIG. 14 to reproduce and output data.

That is, the tuner equipment 40 issues at step S11 a command to set the input and output stages of the decoder 43 and the digital to analog (D/A) converter to the muting on state to pause the output processing of unusual images or sound as well as a command to set the input and output stages of the demultiplexer 42 to the muting on state to prevent the inputting of unusual streams.

The tuner equipment 40 at step S12 transmits a control signal from the control micro-computer 46 to the memory 52 in the IEEE 1394 I/F 41 to clear the data held by the memory 52. If there is any memory, not shown, used in various portions in the tuner equipment 40 for data working, such memory also is cleared.

The tuner equipment 40 at step S13 sets data required at the time of initialization or reversion from the paused state of the variable portions or units as necessary.

The tuner equipment 40 at step S14 commands the control micro-computer 46 to set the input stages of the demultiplexer 42 to the muting off state and, after detecting the synchronization byte of an input stream unpacketized by the unpacketizing unit 51, confirms that the stream is being inputted in stability.

The tuner equipment 40 at step S15 commands the control micro-computer 46 to set the output stages of the demultiplexer 42 and the decoder 43 to the muting off state to confirm that the input stream to the decoder 43 has been decoded in stability.

The tuner equipment 40 at step S16 issues a command to set an output stage of the decoder 43 and the input and output stages of the D/A converter to the muting off state to re-output data to the electronic equipment, such as a monitor, a speaker or a VTR, connected thereto, to re-initiate reproduction of normal picture or sound.

By so doing, the tuner equipment 40 is able to decode the data appropriately under control by the control micro-computer 46, such that there is no risk of hang-up of e.g., the demultiplexer 42 or the decoder 43, nor the risk of displaying a noisy picture or outputting unusual sound which might destruct the speaker.

The above cases in which the DIT should be introduced include such a case when the data outputting is to be halted, as when the operating state of the data recording and/or reproducing medium equipment 20 is changed from the playback state to the halted state.

Figure 15:
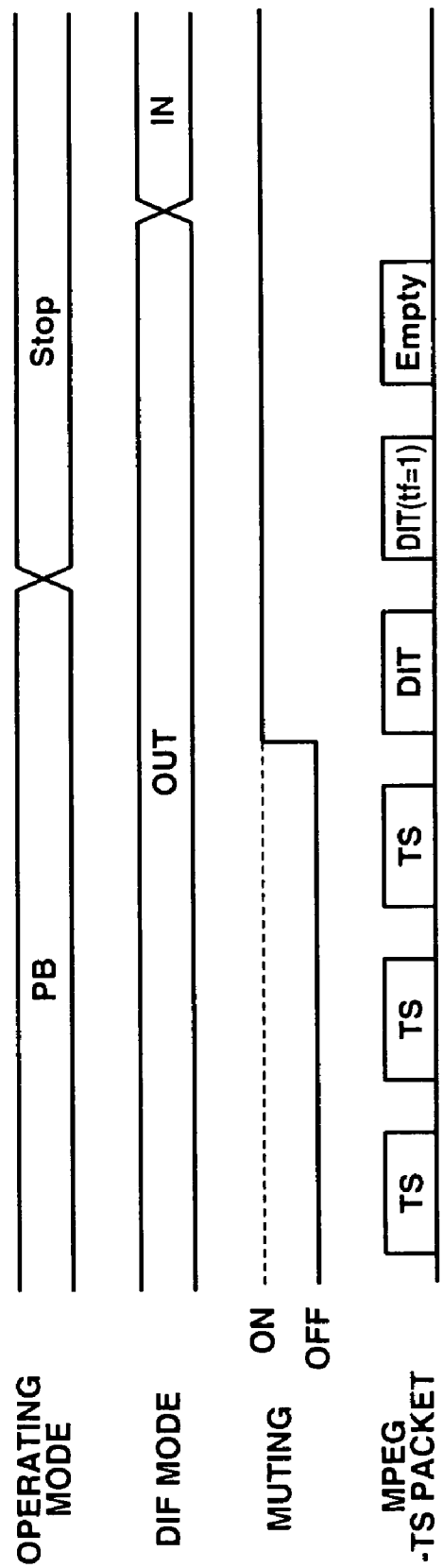
FIG. 15 is a timing chart for DIT insertion in case of transition of the data recording and/or reproducing medium equipment from the playback state to the stop state.

In such case, the operating mode in the data recording and/or reproducing medium equipment 20, the DIF mode in the data recording and/or reproducing medium equipment 20, the control signal sent from the control micro-computer 24 of the data recording and/or reproducing medium equipment 20 to the switch 27, and time changes of the MPEG-TS packet, are shown by the timing chart shown in FIG. 15. That is, if the DIF mode is changed from the output to the input, the data recording and/or reproducing medium equipment 20 inserts a DIT of tf=1 after setting the muting and before setting Bcc>0 or Pcc>0 in the own oPCR to 0.

The above cases in which the DIT should be introduced include such a case when the data outputting is halted in the connected state, specifically, such a case in which the data recording and/or reproducing medium equipment 20 changes its operating mode from the playback state to the operating mode in the course of dubbing.

Figure 16:
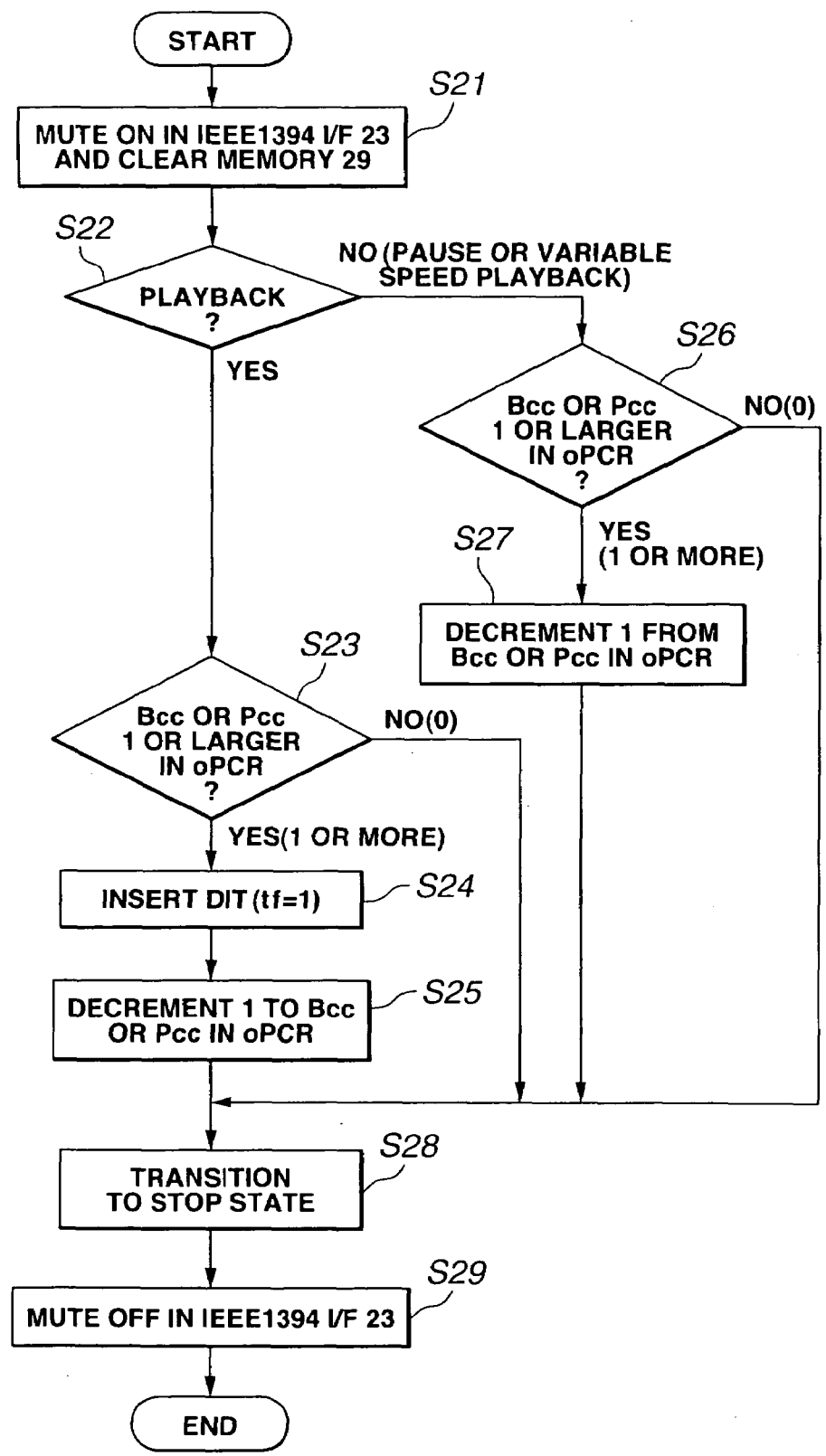
FIG. 16 is a flowchart for illustrating a sequence of steps in DIT insertion in case of transition of the data recording and/or reproducing medium equipment from the playback state to the stop state.

In such case, the data recording and/or reproducing medium equipment 20 inserts a DIT tf=1. The sequence of operations in the data recording and/or reproducing medium equipment 20 is as shown in FIG. 16. That is, the data recording and/or reproducing medium equipment 20 at step S21 sends a control signal from the control micro-computer 24 to the switch 27 to set the muting on state to prevent data from being inputted to the IEEE 1394 I/F 23. The data recording and/or reproducing medium equipment 20 also sends a control signal from the control micro-computer 24 to the memory 29 in the IEEE 1394 I/F 23 to clear the data held in the memory 29.

The data recording and/or reproducing medium equipment 20 then deciphers at step S22 whether or not the operating mode is the playback state.

If the operating mode is not the playback state, the data recording and/or reproducing medium equipment 20 verifies at step S26 whether or not the Bcc or Pcc in oPCR is not less than 1, that is whether or not the operating state is the connected state.

If the Bcc and Pcc in oPCR are both 0, the data recording and/or reproducing medium equipment 20 transfers to the processing of step S28.

If the Bcc or Pcc in oPCR is not less than 1, the data recording and/or reproducing medium equipment 20 at step S27 decrements Bcc or Pcc in oPCR by 1.

If the data recording and/or reproducing medium equipment 20 has verified at step S22 that the operating state is the playback state, it deciphers at step S23 whether or not the Bcc or the Pcc in oPCR ir not less than 1.

If the Bcc and Pcc in oPCR are both 0, the data recording and/or reproducing medium equipment 20 transfers to the processing of step S28.

If the Bcc or Pcc in oPCR is not less than 1, the data recording and/or reproducing medium equipment 20 at step S24 sends a DIT tf=1 from the control micro-computer 24 to the memory 29 to insert the DIT into data.

The data recording and/or reproducing medium equipment 20 at step S25 decrements the Bcc or Pcc in oPCR by 1.

The data recording and/or reproducing medium equipment 20 at step S28 transfers to the stop state, after which it sends a control signal at step S29 from the control micro-computer 24 to the switch 27 to turn the muting off to permit data to be inputted to the IEEE 1394 I/F 23 to terminate the sequence of operations.

Meanwhile, the data recording and/or reproducing medium equipment 20 is able to apply this processing to the case of transition of the operating state from the playback state to the fast feed or fast rewind state.

It is by the above-described sequence of operations that the data recording and/or reproducing medium equipment 20 introduces the DIT at the aforementioned timing. The data recording and/or reproducing medium equipment 20 packetizes the data, having introduced therein the DIT indicating that the data being reproduced has been halted, in the packetizing unit 30, and outputs the packetized data as MPEG-TS to outside over the IEEE 1394 serial bus 60.

The tuner equipment 40, which has received the MPEG-TS, performs the sequence of operations, shown in FIG. 14, to reproduce data. By so doing, the tuner equipment 40 is able to decode data appropriately under control by the control micro-computer 46, without the risk of hang-up of each component, such as the demultiplexer 42 or the decoder 43, even on abrupt transition from the playback state to the halt state. Thus, it is impossible to prevent display of a noisy picture or outputting of an unusual sound which might destruct a speaker.

The data output seizure based on a connection rule consistent with the IEC 61883, for which the DIT should be inserted into data for transmission, is explained. It is assumed here that the data recording and/or reproducing medium equipment 20 seizes a default channel used by the tuner equipment 40 and outputs on the seized channel.

Figure 17:
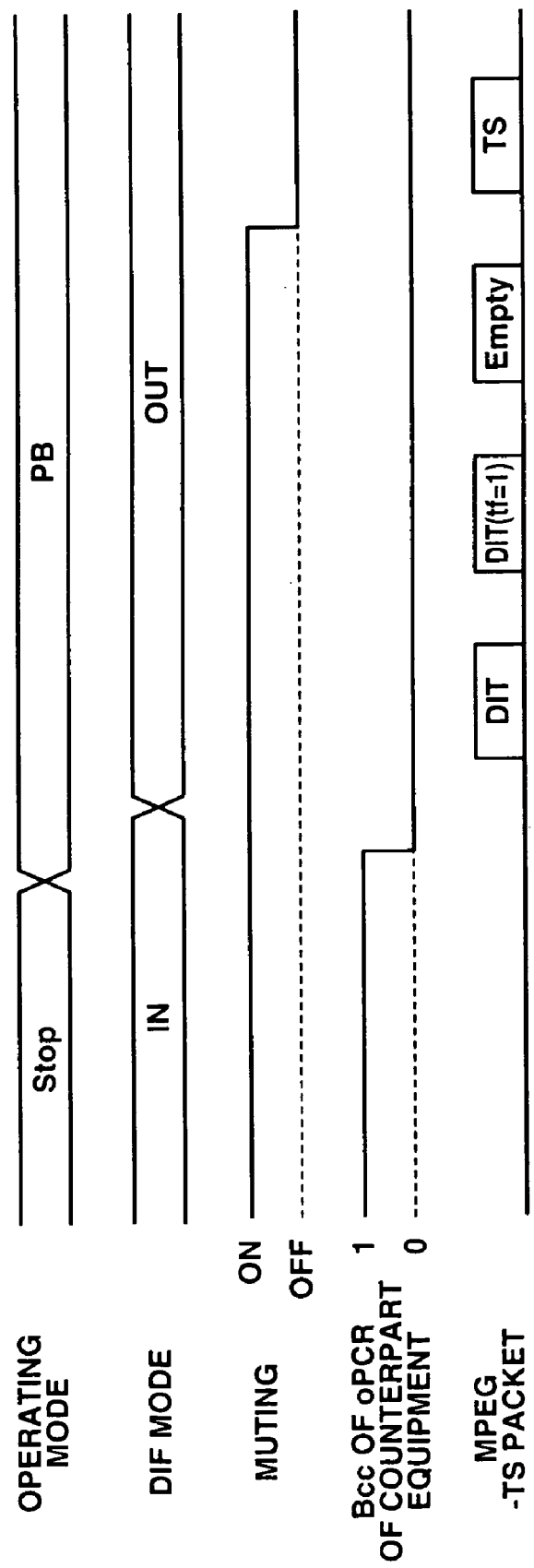
FIG. 17 is a timing chart for DIT insertion in case a data recording and/or reproducing medium equipment acquires and outputs a channel used by the tuner equipment.

In such case, the operating mode in the data recording and/or reproducing medium equipment 20, and time changes in the DIF mode in the data recording and/or reproducing medium equipment 20, Bcc in oPCR of the tuner equipment 40 and in the MPEG-TS packet, are shown as in the timing chart of FIG. 17. That is, the data recording and/or reproducing medium equipment 20 sets Bcc of oPCR of the tuner equipment 40 from 1 to 0, while setting Bcc or Pcc in the own oPCR from 0 to 1. Before releasing the muting, the data recording and/or reproducing medium equipment 20 inserts a sole DIT tf=1.

Figure 18:
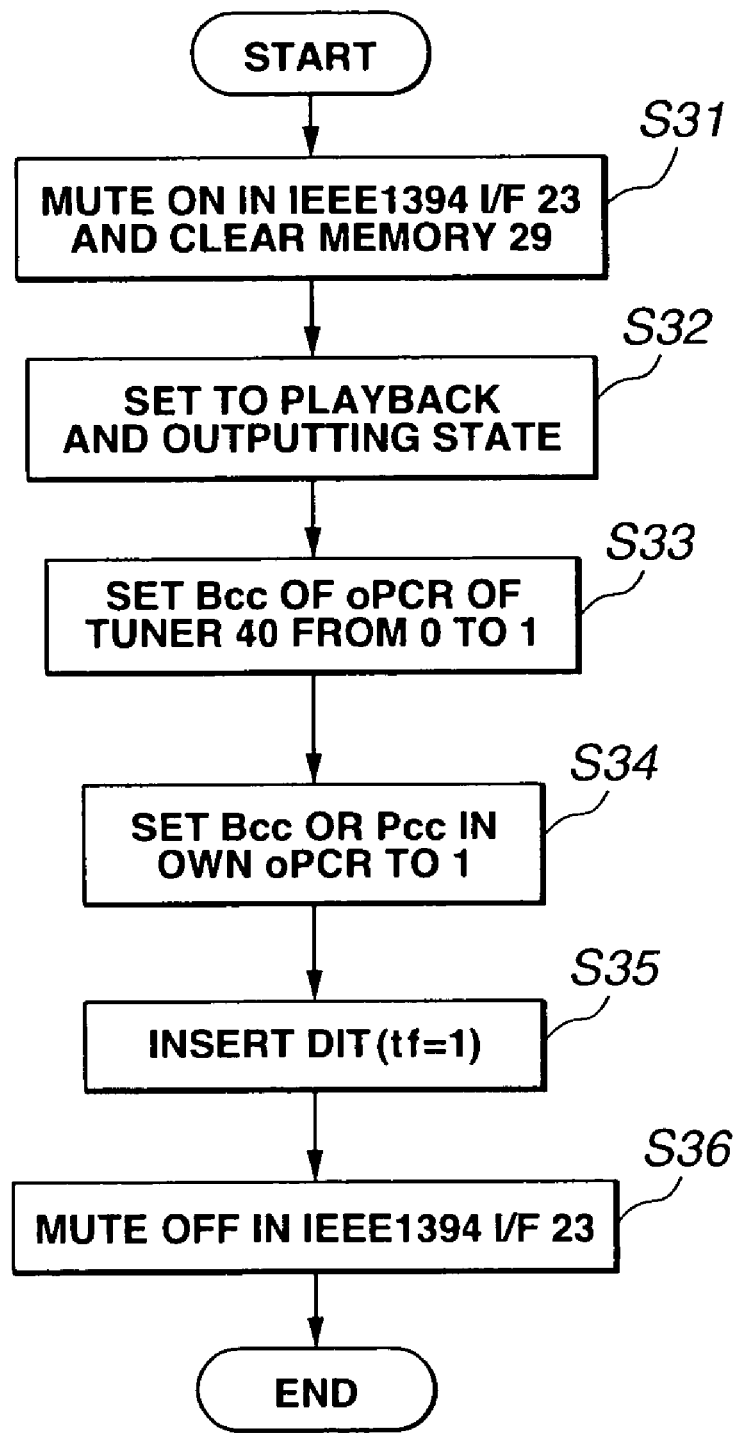
FIG. 18 is a flowchart for illustrating a sequence of steps in DIT insertion in case a data recording and/or reproducing medium equipment acquires and outputs a channel used by the tuner equipment.

The sequence of operations in the data recording and/or reproducing medium equipment 20 is as shown in FIG. 18. That is, the data recording and/or reproducing medium equipment 20 at step S31 turns on the muting, to prevent data from being inputted from the control micro-computer 24 to the switch 27, at the same time as it transmits a control signal from the control micro-computer 24 to the memory 29 in the IEEE 1394 I/F 23 to clear the data held in the memory 29.

The data recording and/or reproducing medium equipment 20 then sets at step S32 the operation state to the playback and outputting state.

The data recording and/or reproducing medium equipment 20 at step S34 sets Bcc or Pcc of the own oPCR from 0 to 1.

The data recording and/or reproducing medium equipment 20 at step S35 sends a DIT tf=1 from the control micro-computer 24 to the memory 29 to insert this DIT into data.

The data recording and/or reproducing medium equipment 20 at step S36 transmits a control signal from the control micro-computer 24 to the switch 27 to turn off the muting to permit data to be inputted to the IEEE 1394 I/F 23 to terminate a sequence of operations.

By the above-described sequence of operations, the data recording and/or reproducing medium equipment 20 inserts two DITs data at the aforementioned timing to packetize the data to output the resulting data to outside as MPEG-TS over the IEEE 1394 serial bus 60.

On reception of the MPEG-TS, the tuner equipment 40 performs the sequence of operations shown in FIG. 14 to reproduce the data. By so doing, the tuner equipment 40 is able to decode the data appropriately under control by the control micro-computer 46, so that there is now no risk of hang-up of each component, such as the demultiplexer 42 or the decoder 43, even on abrupt transition from the playback state to the halt state. Thus, it is possible to prevent display of a noisy picture or outputting of an unusual sound which might destruct a speaker.

Such a case is now explained: in which the MPEG-TS outputted by the data recording and/or reproducing medium equipment 20 cannot cope with variable speed playback, in which case it is necessary to insert DIT into data for transmission, as explained previously.

In such case, the data recording and/or reproducing medium equipment 20 inserts the DIT when the mechanical mode transfers to the variable speed playback state, and sets the muting to output an empty packet during variable speed playback. Specifically, the data recording and/or reproducing medium equipment 20 inserts a DIT data of tf=1 when transferring from the usual playback state to the playback pause, fast feed, fast rewind or slow playback. The data recording and/or reproducing medium equipment 20 also inserts a DIT data of tf=1 when transferring from the playback pause, fast feed, fast rewind or slow playback to the usual playback state. However, it is unnecessary for the data recording and/or reproducing medium equipment 20 to insert the DIT in transferring from the playback pause, fast feed, fast rewind or slow playback to the stop state.

Figure 19:
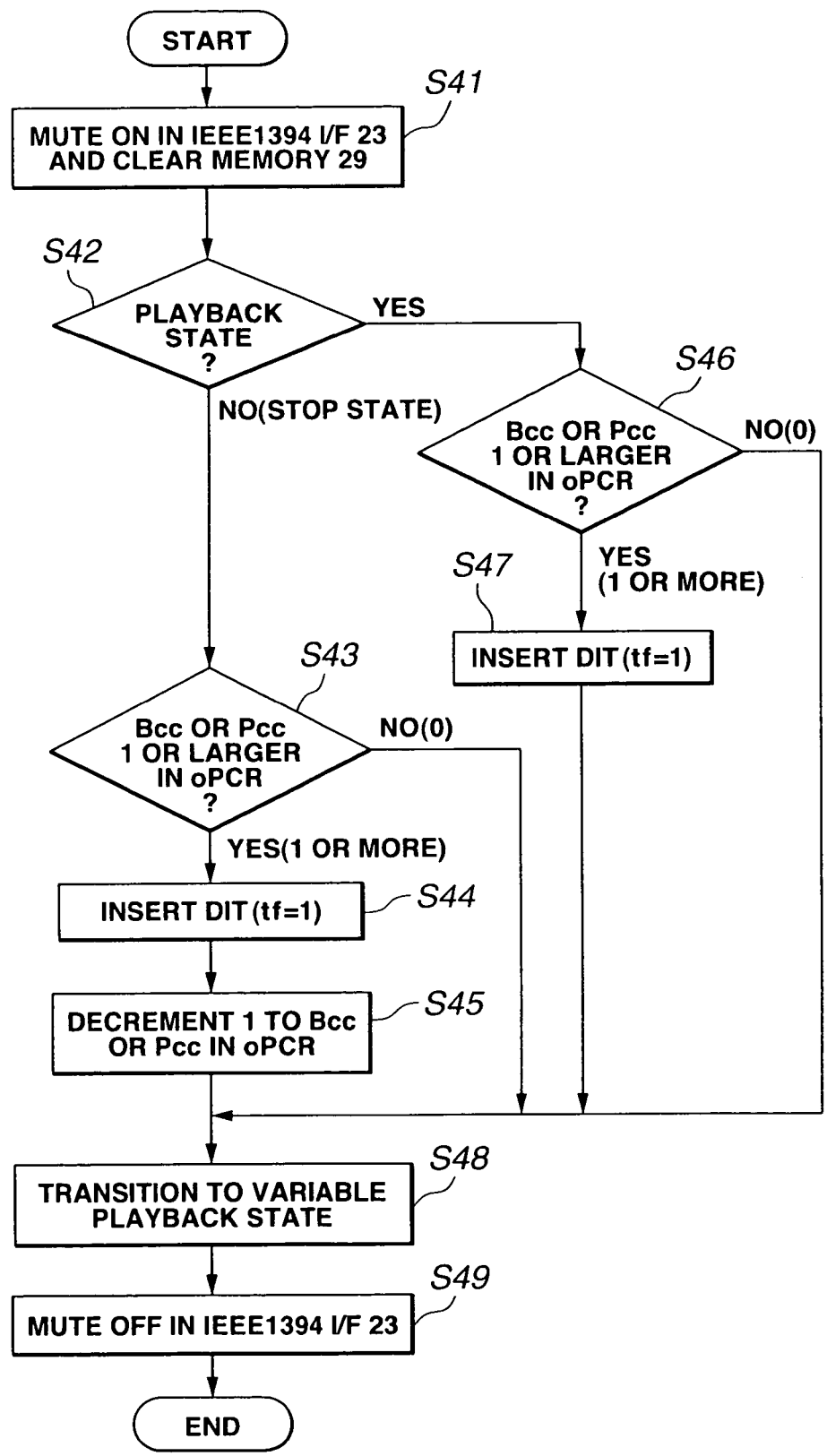
FIG. 19 is a flowchart for illustrating a sequence of steps performed by a data recording and/or reproducing medium equipment in DIT insertion in case a stream outputted by a data recording and/or reproducing medium: equipment is unable to cope with variable speed reproduction.

The sequence of operations in the data recording and/or reproducing medium equipment 20 is as shown in FIG. 19. That is, the data recording and/or reproducing medium equipment 20 at step S41 transmits a control signal from the control micro- computer 24 to the switch 27 to turn on the muting to prevent data from being inputted to the IEEE 1394 I/F 23, while transmitting a control signal from the control micro- computer 24 to the memory 29 in the IEEE 1394 I/F 23 to clear the data held in the memory 29.

The data recording and/or reproducing medium equipment 20 the deciphers at step S42 whether or not the operating state is the playback state.

If the operating state is the playback state, the data recording and/or reproducing medium equipment 20 at step S46 deciphers whether or not Bcc or Pcc in oPCR is not less than 1, that is whether or not the connection state persists.

If Bcc and Pcc in oPCR are 0, the data recording and/or reproducing medium equipment 20 transfers to the processing at step S48.

If Bcc or Pcc in oPCR is not less than 1, the data recording and/or reproducing medium equipment 20 at step S47 sends a DIT tf=1 from the control micro-computer 24 to the memory 29 to insert this DIT into data, before proceeding to the processing of step S48.

If the data recording and/or reproducing medium equipment 20 at step S42 deciphers that the operating state is not the playback state but is a paused state, it transfers to step S43 to decipher whether or not Bcc or Pcc in oPCR is not less than 1.

If both Bcc and Pcc in oPCR are both 0, the data recording and/or reproducing medium equipment 20 proceeds to the processing at step S48.

If Bcc or Pcc in oPCR is not less than 1, the data recording and/or reproducing medium equipment 20 at step S44 sends a DIT tf=1 from the control micro-computer 24 to the memory 29 to insert this DIT into data.

The data recording and/or reproducing medium equipment 20 at step S48- transfers to the variable speed playback to transmit a control signal at step S49 from the control micro-computer 24 to the switch 27 to turn off the muting to permit data to be inputted to the IEEE 1394 I/F 23 to terminate the sequence of operations.

Meanwhile, the data recording and/or reproducing medium equipment 20 is able to apply this processing to the case of transition of the operating mode to the paused state.

By this sequence of operations, the data recording and/or reproducing medium equipment 20 inserts the DIT at the aforementioned timing. The data recording and/or reproducing medium equipment 20 packetizes the data, having the DIT introduced therein, in the 1394 packetizing unit 30, to output the packetized data to outside as MPEG-TS over the IEEE 1394 serial bus 60.

On reception of the MPEG-TS, the tuner equipment 40 performs the sequence of operations shown in FIG. 6 to reproduce data. By so doing, the tuner equipment 40 is able to decode data appropriately under control by the control micro-computer 46, without the risk of hang-up of each component, such as the demultiplexer 42 or the decoder 43, even on abrupt transition from the playback state to the halt state, such that it is possible to prevent display of a noisy picture or outputting of an unusual sound which might destruct a speaker.

As a case in which it is necessary to insert DIT into data for transmission such a case is now explained, in which there is a transition of changes in contents thus requiring DIT insertion into data for transmission. This is such a case in which digital contents of a program A and a program B, different from each other, such as junction of the MPEG contents or overwrite recording of the MPEG contents are recorded in succession on a recording medium of the data recording and/or reproducing medium equipment 20.

Figure 20:
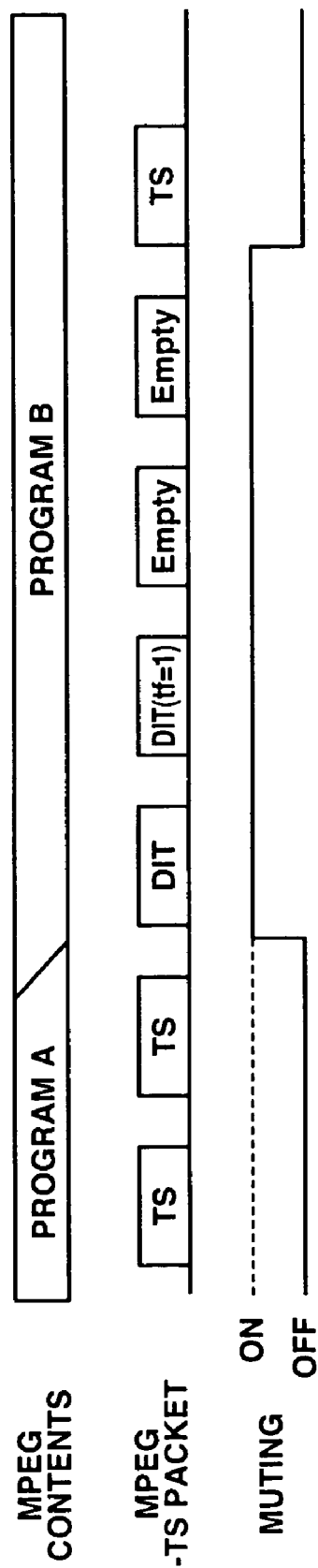
FIG. 20 is a timing chart for DIT insertion in case two digital contents different from each other have been recorded in succession on a recording medium of the data recording and/or reproducing medium equipment.

In such case, time changes in the MPEG contents and MPEG-TS packets recorded on the recording medium of the data recording and/or reproducing medium equipment 20 and control signals for muting control sent from the control micro- computer 24 of the data recording and/or reproducing medium equipment 20 to the switch 27, are shown in a timing chart of FIG. 20. That is, the data recording and/or reproducing medium equipment 20 inserts a DIT of tf=1 in transition from the program A to the program B.

The data recording and/or reproducing medium equipment 20 similarly inserts the DIT when the transition in the MPEG contents in the recording medium is on the boundary between the contents and an unrecorded portion or on the boundary between the digital and analog contents when both the digital and analog contents are recordable as in D-VHS, the recording portions of these contents existing together.

Figure 21:
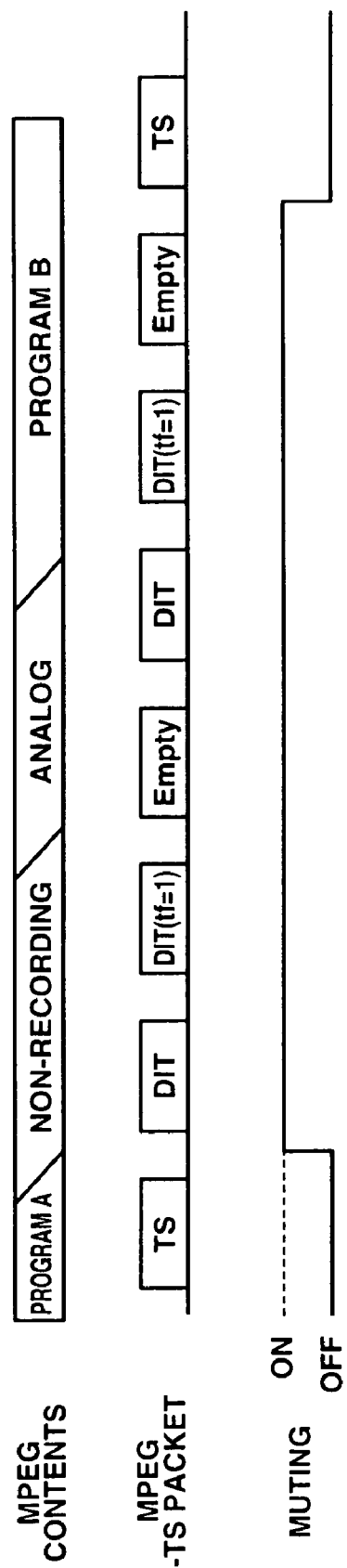
FIG. 21 is a timing chart for DIT insertion in case digital contents, analog contents an non-recorded portion have been recorded in a commingled state on a recording medium of a data recording and/or reproducing medium equipment.

In this case, time changes in the MPEG contents and the MPEG-TS packets recorded on the recording medium of the data recording and/or reproducing medium equipment 0.20 and control signals for muting control sent from the control micro- computer 24 of the data recording and/or reproducing medium equipment 20 to the switch 27 are indicated by the timing chart shown in FIG. 21. That is, when the data recording and/or reproducing medium equipment 20 reproduces the recording medium from the portion thereof having the digital contents recorded thereon to the portion thereof having the analog contents recorded thereon, it inserts a sole DIT.

Figure 22:
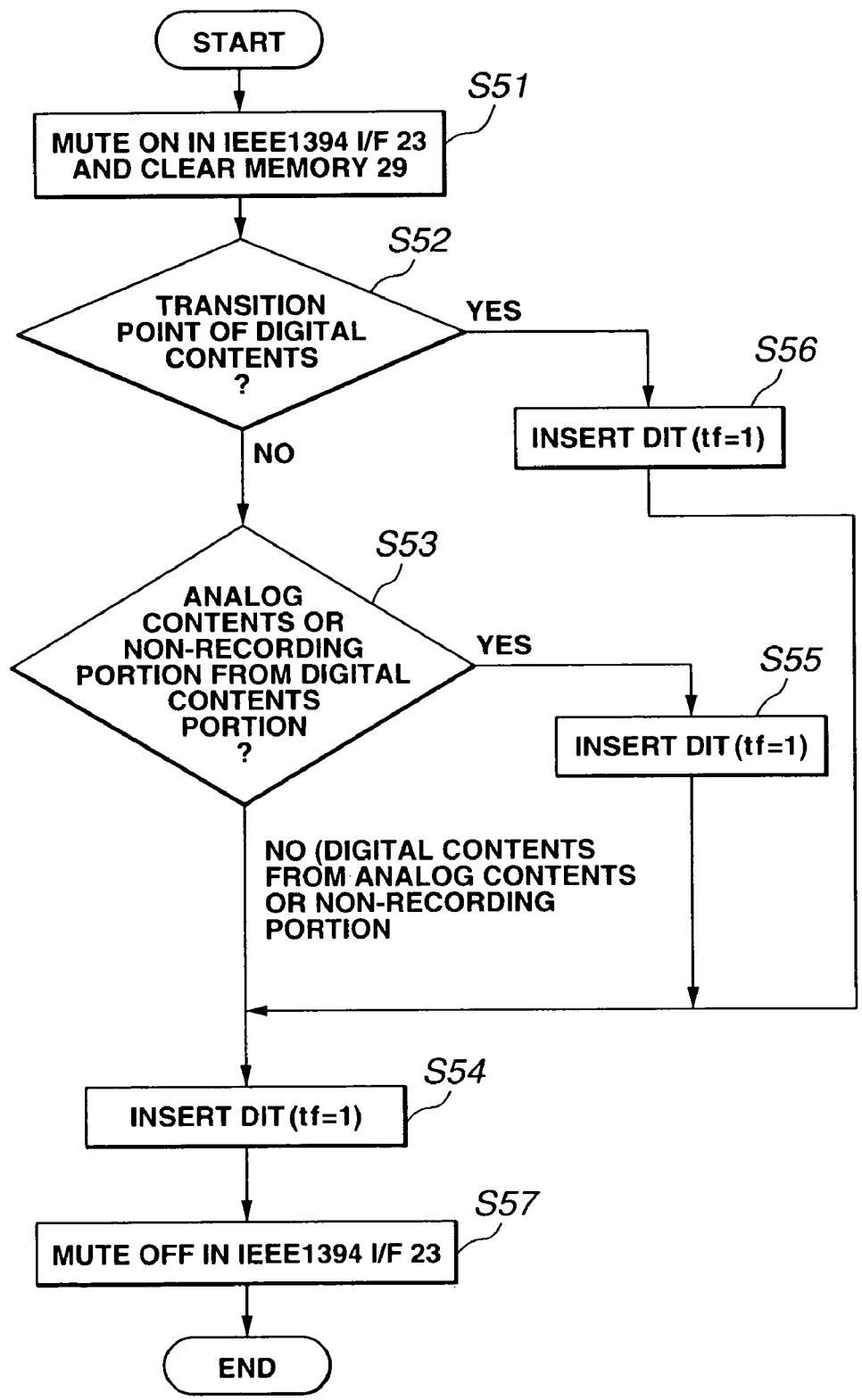
FIG. 22 is a flowchart for illustrating a sequence of steps performed by a data recording and/or reproducing medium equipment in DIT insertion in case digital contents, analog contents an non-recorded portion have been recorded in a commingled state on a recording medium of a data recording and/or reproducing medium equipment.

The sequence of operations in the data recording and/or reproducing medium equipment 20 is as shown in FIG. 22. That is, the data recording and/or reproducing medium equipment 20 at step S51 sends a control signal from the control micro- computer 24 to the switch 27 to turn the muting on to prevent data from being inputted to the IEEE 1394 I/F 23, while transmitting a control signal from the control micro- computer 24 to the memory 29 in the IEEE 1394 I/F 23 to clear the data held in the memory 29.

The data recording and/or reproducing medium equipment 20 at step S52 checks whether or not there is a transition point in the digital contents.

If there is a transition point in the digital contents, the data recording and/or reproducing medium equipment 20 at step S56 transmits a DIT of tf=1 from the control micro-computer 24 to the memory 29 to insert the DIT into the data. The data recording and/or reproducing medium equipment 20 then shifts to the processing of step S57.

If there is no transition in the digital contents, the data recording and/or reproducing medium equipment 20 checks whether or not recording is made on the recording medium from the digital contents to an unrecorded portion or analog contents continuously.

If recording is made on the recording medium from the digital contents to an unrecorded portion or analog contents continuously, the data recording and/or reproducing medium equipment 20 at step S55 transmits a DIT of tf=1 from the control micro-computer 24 to the memory 29 to insert this DIT into data. The data recording and/or reproducing medium equipment 20 then transfers to the processing of step S57.

If recording is made from an unrecorded portion or the analog contents to the digital contents, the data recording and/or reproducing medium equipment 20 at step S54 transmits a DIT if tf=1 from the control micro-computer 24 to the memory 29 to insert this DIT into the data.

The data recording and/or reproducing medium equipment 20 at step S57 sends a control signal from the control micro-computer 24 to the switch 27 to set the muting off state to permit data to be inputted to the IEEE 1394 I/F 23. The data recording and/or reproducing medium equipment 20 then terminates the sequence of operations.

By this sequence of operations, the data recording and/or reproducing medium equipment 20 inserts the DIT into data at the aforementioned timing responsive to the transition point of the MPEG contents, and packetizes the data in the 1394 packetizing unit 30 to output the packetized data as MPEG-TS to outside over the IEEE 1394 serial bus 60.

On reception of the MPEG-TS, the tuner equipment 40 performs the above-described sequence of operations, shown in FIG. 6, to reproduce data. By so doing, the tuner equipment 40 is able to decode data appropriately under control by the control microcomputer 46, without the risk of hang-up of each component, such as the demultiplexer 42 or the decoder 43, even on abrupt transition from the playback state to the halt state, such that it is possible to prevent display of a noisy picture or outputting of an unusual sound which might destruct a speaker.

The cases of data recording starting and data recording stop, in which it is necessary to insert the DIT into data to transmit the resulting data, are hereinafter explained. Examples of these cases include a case wherein the data recording and/or reproducing medium equipment 20 changes its operating mode from the stop mode to the recording state or from the recording state to the operating mode.

If, in these cases, data is to be recorded on the recording medium, a DIT of tf=1 is first inserted before proceeding to data recording. If the data recording and/or reproducing medium equipment 20 stops or pauses the data recording on the recording medium, it records a DIT of tf=1 at the trailing end of the recorded data before proceeding to the stop state or paused state.

By performing this sequence of operations, the data recording and/or reproducing medium equipment 20 inserts the DIT at the aforementioned timing. When reproducing these data, the data recording and/or reproducing medium equipment 20 packetizes the data in the 1394 packetizing unit 30 to output the resulting data as MPEG-TS to outside over the IEEE 1394 serial bus 60.

On reception of the MPEG-TS, the tuner equipment 40 performs the above-described sequence of operations, shown in FIG. 6, to reproduce data. By so doing, the tuner equipment 40 is able to decode data appropriately under control by the control micro-computer 46, without the risk of hang-up of each component, such as the demultiplexer 42 or the decoder 43, even on abrupt transition from the playback state to the halt state, such that it is possible to prevent display of a noisy picture or outputting of an unusual sound which might destruct a speaker.

Thus, the data recording and/or reproducing medium equipment 20 inserts the DIT into data responsive to changes in the operating mode or in the contents. This processing can, of course, be applied to the tuner equipment 40.

The tuner equipment 40 also inserts the DIT into data when changing the services received by the tuner unit 44 over the satellite or cable to different services of a selected station to output the service stream over the IEEE 1394 serial bus 60.

That is, the tuner equipment 40 is responsive to changes in the services received by the tuner unit 44 to transmit the DIT from the control micro-computer 46 to the memory 52 to insert the transmitted DIT into the data. The tuner equipment 40 inserts the data, into which has been introduced the DIT, by the 1394 packetizing unit 50, to output the packetized data as MPEG-TS over the IEEE 1394 serial bus 60.

By so doing, the data recording and/or reproducing medium equipment 20, receiving this MPEG-TS, is able to record stable data on the recording medium under control by the control micro-computer 24.

With the IEEE 1394 network 10, embodying the present invention, as described above, it is possible to evade hang-up of an electronic equipment receiving the data by inserting the DIT into data. Thus, an undesirable picture, such as a noisy picture, or an unusual sound, which might destruct the speaker, may be eliminated.

By applying the present invention, it is possible to set a guideline in managing the DIT such as a timing of introducing the DIT.

The present invention is not limited to the above-described embodiment and may be applied not only to the IEEE 1394 network but to a network constructed by a digital serial bus such as so-called Ethernet or universal serial bus (USB).

The present invention is applicable not only to the data recording and/or reproducing medium equipment 20 or tuner equipment 40 but to a household electronic equipment having a function of communication with outside or to an electronic equipment capable of transmission/reception of MPEG-TS, such as a computer.

The present invention is also applicable to a MPEG-pure embodiment adapted to process received DIT. In other respects, the present invention can similarly be modified without altering its technical concept.

What is claimed is:

1. A method for transmitting data in which the data is transmitted from an electronic equipment to other electronic equipment on a network in which a plurality of electronic equipment are connected over a serial bus interface, comprising:

a detection step of detecting the timing of inserting discontinuity information data into contents of the data on said electronic equipment to be recorded and/or reproduced for a recording medium on said other electronic equipment on said network; and a step of inserting said discontinuity information data into said data on detection of the timing of inserting the discontinuity information data in said detection step, wherein said discontinuity information data contains at least an indication of a status change of content and position within a source data, and wherein said detection step detects the timing of inserting discontinuity information data in accordance with a change in an operation mode, a timing change, a content change, and a transition point in digital contents.

2. The data transmitting method according to claim 1 wherein said detection step detects a transition point on the time axis of the contents of the data recorded on said recording medium as said timing.

3. The data transmitting method according to claim 1 wherein said detection step detects the outputting start time of the data recorded on said recording medium as said timing.

4. The data transmitting method according to claim 1 wherein said detection step detects the outputting end time of the data recorded on said recording medium as said timing.

5. The data transmitting method according to claim 1 wherein said detection step detects the time of seizing a channel on said network being used by another electronic equipment on said network and outputting data recorded on said recording medium as said timing.

6. The data transmitting method according to claim 1 wherein said detection step detects the time of transition of data recorded on said recording medium to variable speed playback as said timing.

7. The data transmitting method according to claim 1 wherein said detection step detects the time of contents switching of data recorded on said recording medium as said timing.

8. The data transmitting method according to claim 1 wherein said detection step detects the time of start of recording of data on said recording medium as said timing.

9. The data transmitting method according to claim 1 wherein said detection step detects the time of end of recording of data on said recording medium as said timing.

10. The data transmitting method according to claim 1 wherein said recording medium is a tape-shaped recording medium.

11. The data transmitting method according to claim 1 wherein said recording medium is a disc-shaped recording medium.

12. A method for transmitting data in which the data is transmitted from an electronic equipment to other electronic equipment on a network in which a plurality of electronic equipment are connected over a serial bus interface, comprising:

a detection step of detecting the timing of inserting discontinuity information data into contents received from said electronic equipment through a communication medium different from said serial bus interface to be recorded and/or reproduced for a recording medium on said other electronic equipment on said network; and a step of inserting said discontinuity information data into said data on detection of the timing of inserting the discontinuity information data in said detection step, wherein said discontinuity information data contains at least an indication of a status change of content and position within a source data, and wherein said detection step detects the timing of inserting discontinuity information data in accordance with a change in an operation mode, a timing change, a content change, and a transition point in digital contents.

13. The data transmitting method according to claim 12 wherein said detection step detects a transition point of contents of data received over said serial bus interface and into which has been inserted said discontinuity information data as said timing.

14. The data transmitting method according to claim 12 wherein said detection step detects the time of switching on station selection from a program received from outside over a communication medium different from the serial bus interface to a different program.

15. An electronic equipment in which the data is transmitted from an electronic equipment to other electronic equipment on a network constructed by connecting a plurality of electronic equipment over a serial bus interface, comprising:

means for generating discontinuity information data indicating discontinuity of said data;

means for detecting the timing of inserting the discontinuity information data into contents of the data on said electronic equipment to be recorded and/or reproduced for a recording medium on said other electronic equipment on said network; and means for inserting said discontinuity information data into said data on detection of the timing of inserting the discontinuity information data by said detection means, wherein said discontinuity information data contains at least an indication of a status change of content and position within a source date, and wherein said detection means detects the timing of inserting discontinuity information data in accordance with a change in an operation mode, a tuning change, a content change, and a transition point in digital contents.

16. The electronic equipment according to claim 15 wherein said detection means detects a transition point on the time axis of the contents of the data recorded on said recording medium as said timing.

17. The electronic equipment according to claim 15 wherein said detection means detects the outputting start time of the data recorded on said recording medium as said timing.

18. The electronic equipment according to claim 15 wherein said detection means detects the outputting end time of the data recorded on said recording medium as said timing.

19. The electronic equipment according to claim 15 wherein said detection means detects the time of seizing a channel on said network being used by anther electronic equipment on said network and outputting data recorded on said recording medium as said timing.

20. The electronic equipment according to claim 15 wherein said detection means detects the time of transition of data recorded on said recording medium to variable speed playback as said timing.

21. The electronic equipment according to claim 15 wherein said detection means detects the time of contents switching of data recorded on said recording medium as said timing.

22. The electronic equipment according to claim 15 wherein said detection means detects the time of start of recording of data on said recording medium as said timing.

23. The electronic equipment according to claim 15 wherein said detection means detects the time of end of recording of data on said recording medium as said timing.

24. The electronic equipment according to claim 15 wherein said recording medium is a tape-shaped recording medium.

25. The data transmitting method according to claim 15 wherein said recording medium is a disc-shaped recording medium.

26. An electronic equipment in which the data is transmitted from an electronic equipment to other electronic equipment on a network constructed by connecting a plurality of electronic equipment over a serial bus interface, comprising:

tuning means for timing data received from outside over a communication medium different from the serial bus interface; and generating means for generating discontinuity information data of data received through said serial bus interface and/or said tuning in means;

said generating means inserting the generated discontinuity information data into contents of data on said electronic equipment to be recorded and/or reproduced for a recording medium on said other electronic equipment on said network, wherein said data is received through said tuning means, and wherein said discontinuity information data contains at least an indication of a status change of content and position within a source data, and wherein said generating means generates discontinuity information data to be inserted when a change in an operation mode, a timing change, a content change, or a transition point in digital contents is detected.

27. The electronic equipment according to claim 26 further detection means for detecting the point of transition of contents of data having inserted therein said discontinuity information data received over said serial bus interface.

28. The electronic equipment according to claim 26 where said generating means inserts said discontinuity information data when switching from a program being received from outside through said tuning means to a different program on station selection.

* * * * *